United States Patent
Imamura

(10) Patent No.: US 8,520,125 B2
(45) Date of Patent: Aug. 27, 2013

(54) IMAGING DEVICE AND DISTANCE-MEASURING DEVICE USING SAME

(75) Inventor: Norihiro Imamura, Osaka (JP)

(73) Assignee: Panasonic Corporation, Osaka (JP)

(*) Notice: Subject to any disclaimer, the term of this patent is extended or adjusted under 35 U.S.C. 154(b) by 271 days.

(21) Appl. No.: 13/146,714

(22) PCT Filed: Oct. 22, 2010

(86) PCT No.: PCT/JP2010/006266
§ 371 (c)(1),
(2), (4) Date: Jul. 28, 2011

(87) PCT Pub. No.: WO2011/052172
PCT Pub. Date: May 5, 2011

(65) Prior Publication Data
US 2011/0286634 A1   Nov. 24, 2011

(30) Foreign Application Priority Data

Oct. 27, 2009  (JP) ................... 2009-246789

(51) Int. Cl.
H04N 9/097  (2006.01)
H04N 7/18   (2006.01)
H04N 5/225  (2006.01)
H04N 5/217  (2011.01)
G06K 9/00   (2006.01)

(52) U.S. Cl.
USPC ........... 348/336; 348/135; 348/241; 348/262; 382/106

(58) Field of Classification Search
USPC ............. 348/135, 139, 241, 262, 263, 336, 348/340; 382/106
See application file for complete search history.

(56) References Cited

U.S. PATENT DOCUMENTS 6,963,388 B1* 11/2005 Ohta .................... 348/349
7,463,293 B2* 12/2008 Chauville et al. ........ 348/241
(Continued)

FOREIGN PATENT DOCUMENTS

JP   06-006646 A   1/1994
JP   09-116807 A   5/1997
(Continued)

OTHER PUBLICATIONS

Tisse et al.; "Extended depth-of-filed (EDoF) using sharpness transport across colour channels"; Sep. 11, 2008; Proc. SPIE 7061, Novel Optical Systems Design and Optimization XI.*

(Continued)

*Primary Examiner* — John Villecco
(74) *Attorney, Agent, or Firm* — Renner, Otto, Boisselle & Sklar, LLP

(57) ABSTRACT

An image capture device according to the present invention includes: a first optical system 10 that has a longitudinal chromatic aberration to cause first, second and third colors to form images at mutually different positions on an optical axis; a first image capturing region Na for generating an image that has a component in at least one of the first, second and third colors by using light that has been transmitted through the first optical system 10; a second optical system 20 that has a different longitudinal chromatic aberration from that of the first optical system 10; a second image capturing region Nb for generating an image that has a component in the same color as the at least one color by using light that has been transmitted through the second optical system 20; and an arithmetic processing section C for generating an output image by using one of the two images that has been generated in the first or second image capturing region Na or Nb so as to have the component in the at least one color apiece and that has the component with the higher degree of sharpness.

18 Claims, 16 Drawing Sheets

(56) References Cited

U.S. PATENT DOCUMENTS

| | | | |
|---|---|---|---|
| 7,920,172 B2* | 4/2011 | Chanas et al. | 348/222.1 |
| 7,924,327 B2* | 4/2011 | Nagashima et al. | 348/239 |
| 8,369,618 B2* | 2/2013 | Murakami et al. | 382/167 |
| 8,379,321 B2* | 2/2013 | Szapiel et al. | 359/707 |
| 2007/0116375 A1 | 5/2007 | Utsugi et al. | |
| 2008/0062409 A1 | 3/2008 | Utsugi et al. | |
| 2008/0107350 A1 | 5/2008 | Guichard et al. | |
| 2010/0165156 A1* | 7/2010 | Mingam | 348/262 |
| 2011/0109749 A1* | 5/2011 | Chanas et al. | 348/164 |
| 2011/0157399 A1* | 6/2011 | Ogasahara | 348/222.1 |
| 2011/0187887 A1* | 8/2011 | Inoue | 348/222.1 |
| 2012/0127360 A1* | 5/2012 | Devaux et al. | 348/349 |
| 2013/0120564 A1* | 5/2013 | Imamura | 348/135 |

FOREIGN PATENT DOCUMENTS

| | | |
|---|---|---|
| JP | 2005-257567 A | 9/2005 |
| JP | 2005-348319 A | 12/2005 |
| JP | 2006-020275 A | 1/2006 |
| JP | 2008085773 A * | 4/2008 |
| JP | 2008-532449 T | 8/2008 |
| JP | 2009-153074 A | 7/2009 |

OTHER PUBLICATIONS

International Search Report for corresponding International Application No. PCT/JP2010/006266 mailed Dec. 7, 2010.

* cited by examiner (a)

(b)

(a)

(b)

(a)

(b)

(c)

(d)

(a)

(b)

(a)

(b)

(a)

(b)

IMAGING DEVICE AND DISTANCE-MEASURING DEVICE USING SAME

TECHNICAL FIELD

The present invention relates to an image capture device such as a camera.

BACKGROUND ART

The light that has been incident on a lens will have a refractive index that varies according to its wavelength while passing through the material of that lens. That is why if multiple light beams with mutually different wavelengths have been incident on an optical system for an image capture device, a longitudinal chromatic aberration will be produced. As a result, the sharpness of the resultant image will vary from one color to another. And if there is any color with a low degree of sharpness in the image, then that color becomes a factor in debased image quality.

Meanwhile, if the subject is located within the range of the depth of field, an image capture device such a camera can capture a sharp image by focusing right on that subject. And to capture a subject that can be located at any of various positions, the image capture device needs focusing state detecting means and focus adjusting means.

In order to overcome these problems, someone proposed a technique for extending the depth of field and correcting the longitudinal chromatic aberration at the same time by using the longitudinal chromatic aberration of an optical system so that the sharpness of a first color component is reflected on a second color component, which is different from the first color component (see Patent Document No. 1). According to the method disclosed in Patent Document No. 1, the sharpness of the first color component is reflected on the second color component, thereby increasing the sharpness of the second color component. As a result, the depth of field can be extended, and a subject that may be located at any of various distances can be captured relatively sharply even without making a focus adjustment.

CITATION LIST

Patent Literature
Patent Document No. 1: PCT International Application Japanese National-Phase Publication No. 2008-532449

SUMMARY OF INVENTION

Technical Problem

To reflect the sharpness of the first color component on the second color component by the technique of Patent Document No. 1, information needs to be collected about the sharpness of both of the first and second color components. That is why the depth of focus is available only from the range where information about the sharpness of every color is available. Thus, according to the technique disclosed in Patent Document No. 1, there is a limit to the range in which the depth of focus can be extended, and therefore, it is difficult to extend the depth of field sufficiently.

Also, if an image of a subject in a single color (such as the color blue) needs to be captured on a black background, then the image will have no other color components (such as green and red components) than that of the subject itself. For that reason, if the subject image is blurred due to longitudinal chromatic aberration, the sharpness of no other color on the image can be detected and reflected on that of the subject.

It is therefore an object of the present invention to provide an image capture device that can capture an image with sufficient depth of focus and depth of field and with a high degree of sharpness. Another object of the present invention is to provide an image capture device that can shoot a subject in a single color (such as the color blue) on a black background with a high degree of sharpness.

Solution to Problem

An image capture device according to the present invention includes: a first optical system that has a longitudinal chromatic aberration to cause first, second and third colors to form images at mutually different positions on an optical axis; a first image capturing region for generating an image that has a component in at least one of the first, second and third colors by using light that has been transmitted through the first optical system; a second optical system that has a different longitudinal chromatic aberration from that of the first optical system; a second image capturing region for generating an image that has a component in the same color as the at least one color by using light that has been transmitted through the second optical system; and an arithmetic processing section for generating an output image by using one of the two images that has been generated in the first or second image capturing region so as to have the component in the at least one color apiece and that has the component with the higher degree of sharpness.

Another image capture device according to the present invention includes: a first optical system that has a longitudinal chromatic aberration to cause first, second and third colors to form images at mutually different positions on an optical axis; a first image capturing region for generating an image that has a component in at least one of the first, second and third colors by using light that has been transmitted through the first optical system; a second optical system that has a different longitudinal chromatic aberration from that of the first optical system; a second image capturing region for generating an image that has a component in the same color as the at least one color by using light that has been transmitted through the second optical system; and an arithmetic processing section for generating an output image by using one of the two images that has been generated in the first or second image capturing region so as to have the component in the at least one color apiece and that has the component with the higher contrast.

Advantageous Effects of Invention

According to the present invention, an output image is generated by determining, on a color-by-color basis, which of two or more images that have been generated in two or more image capturing regions has the highest degree of sharpness and using the image component with the highest degree of sharpness. As a result, the sharpness of the output image can be increased by a simple method. In addition, since a greater depth of focus can be achieved than by a conventional method, a sufficiently great depth of field can be achieved, too.

Furthermore, according to the present invention, if a red, green or blue subject needs to be captured on a black background, the color sharpness of the subject is greater than a predetermined value in any of two or more image capturing regions. Consequently, an image with a high degree of sharpness can be generated.

Figure 2:
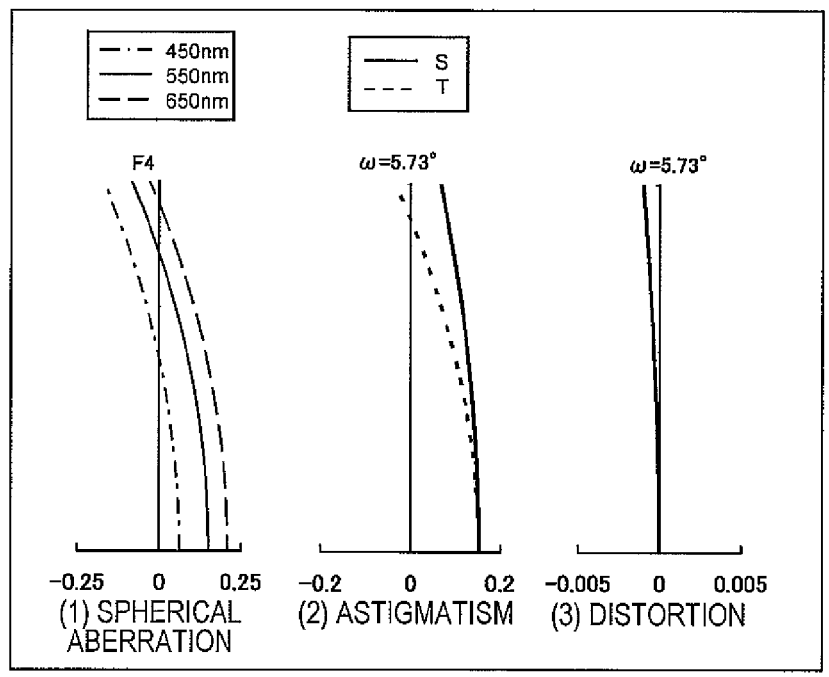
Figure 2:
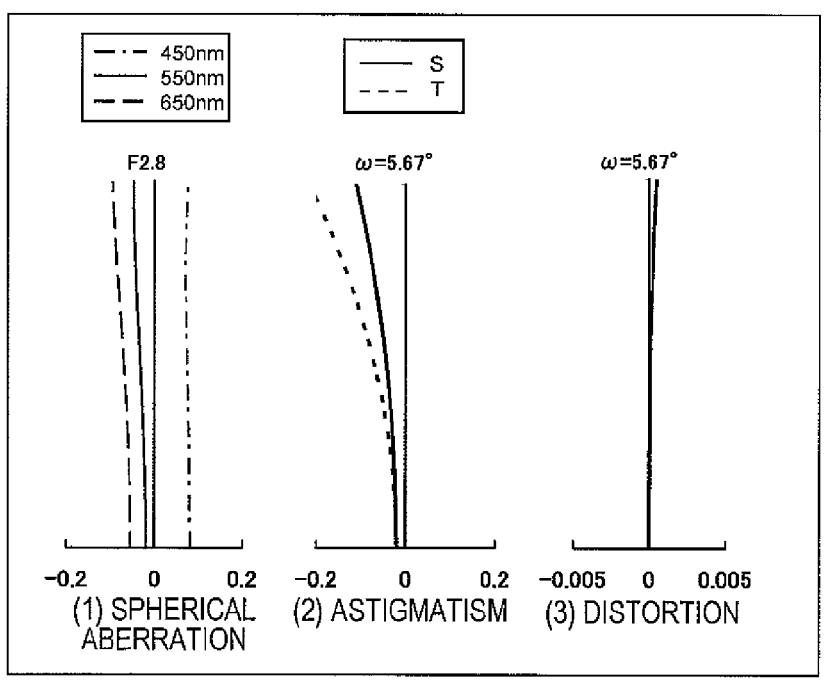

Portions (1), (2) and (3) of FIG. 2(a) are graphs respectively showing the spherical aberration, astigmatism and distortion of a first optical system 10. Portions (1), (2) and (3) of FIG. 2(b) are graphs respectively showing the spherical aberration, astigmatism and distortion of a second optical system 20.

Figure 3:
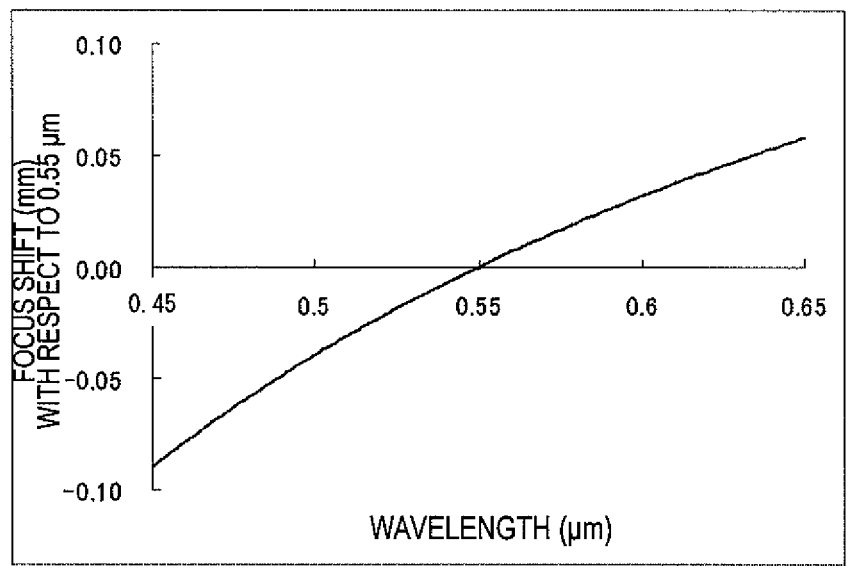
Figure 3:
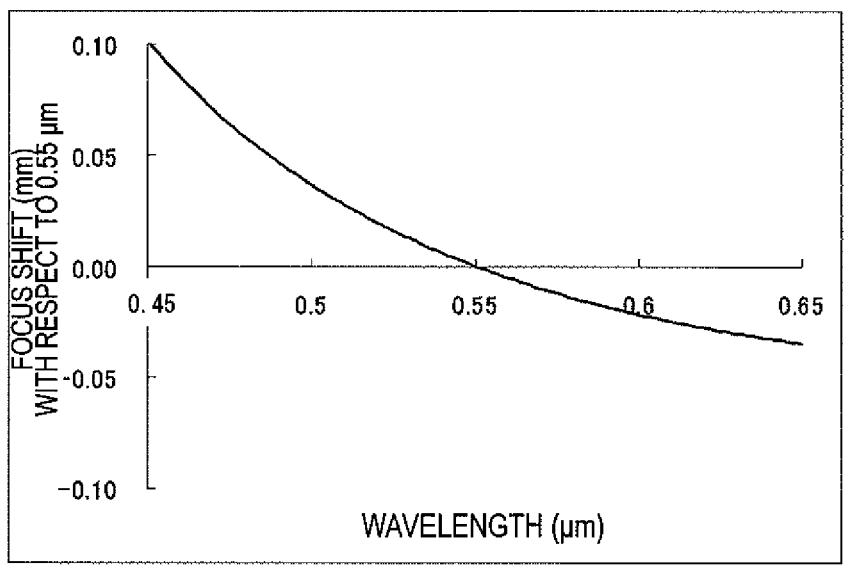

FIGS. 3(a) and 3(b) are graphs showing the longitudinal chromatic aberrations of the first and second optical systems 10 and 20, respectively.

Figure 4:
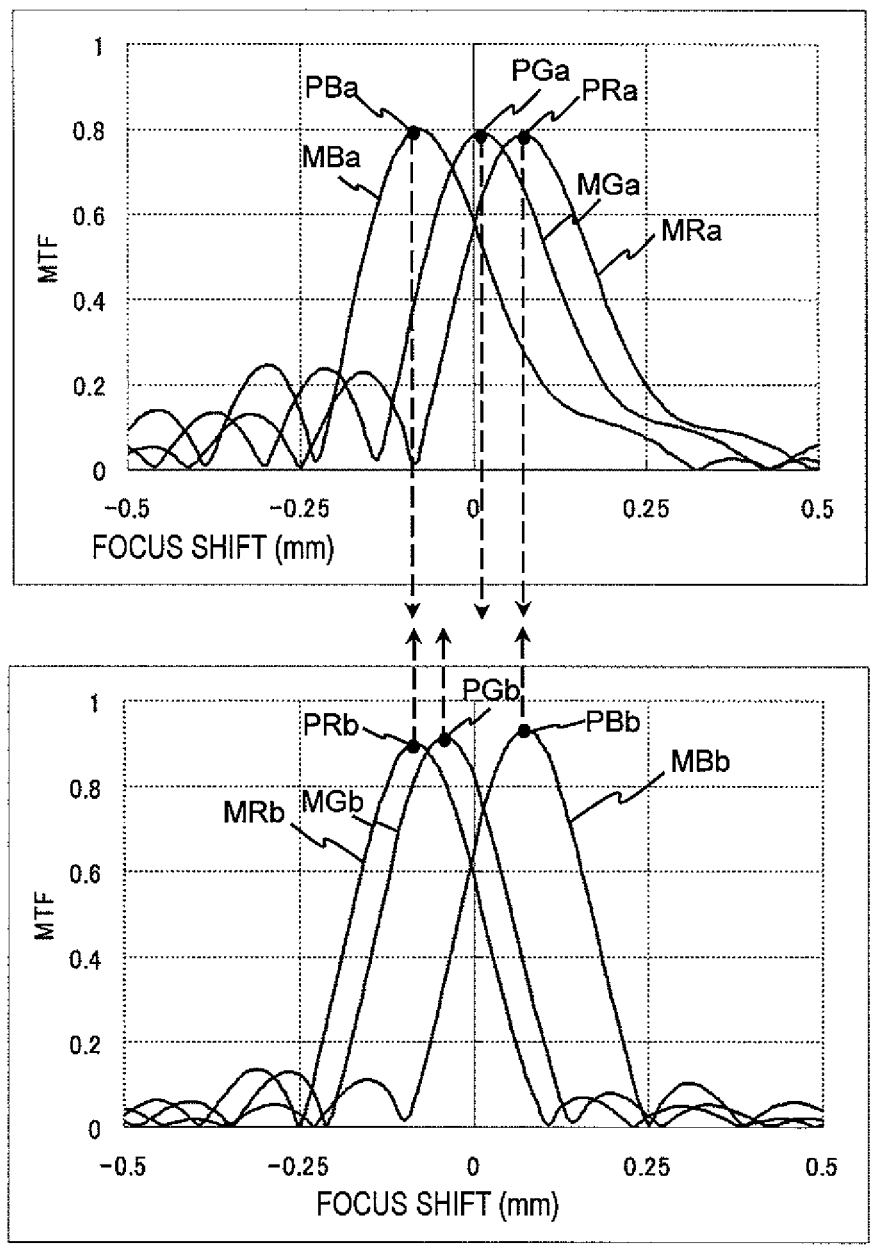

FIG. 4 shows graphs representing the through focus MTF properties of the first and second optical systems 10 and 20.

Figure 5:
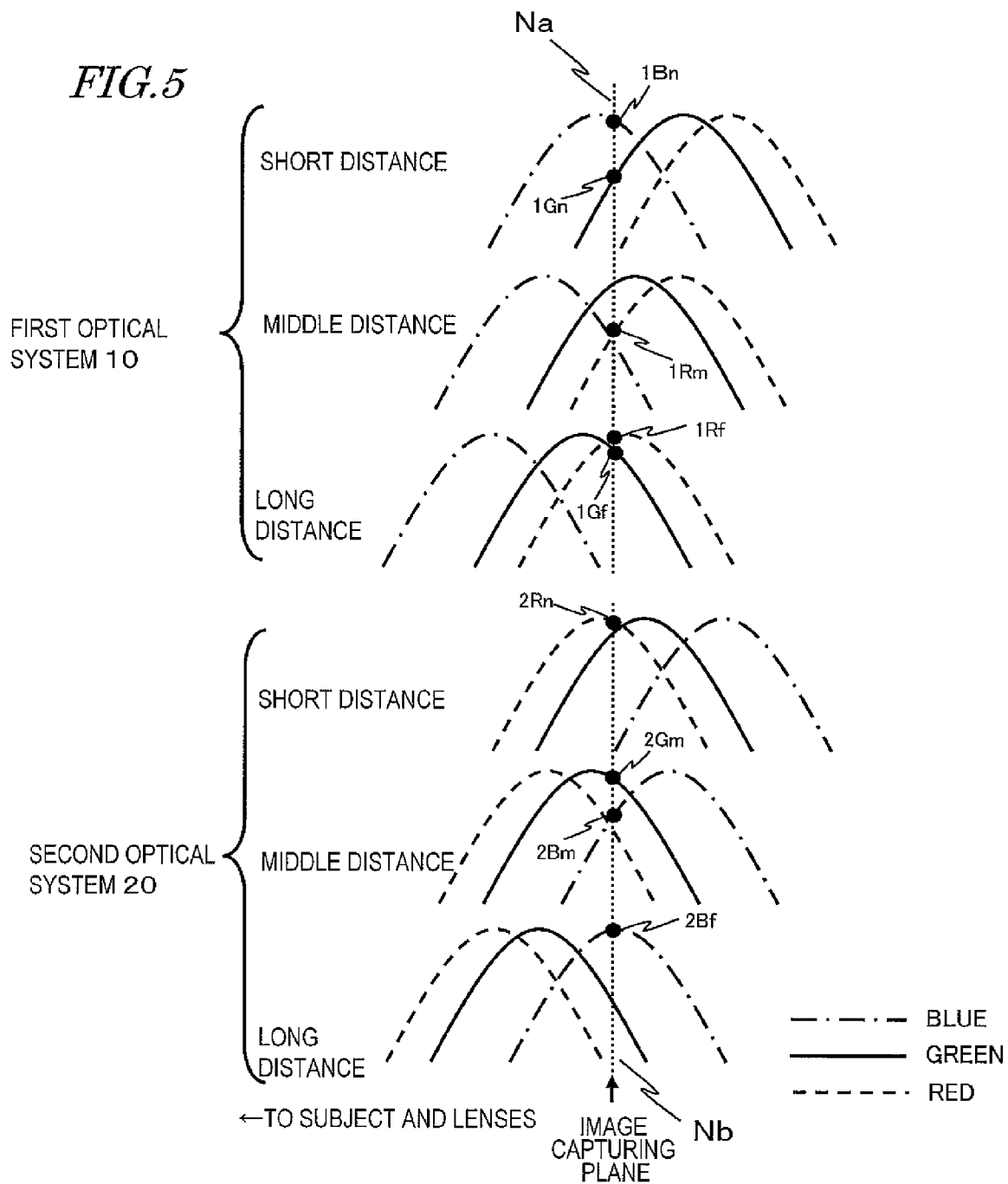

FIG. 5 schematically illustrates the through focus MTF properties of the first and second optical systems 10 and 20 on a subject distance basis.

Figure 6:
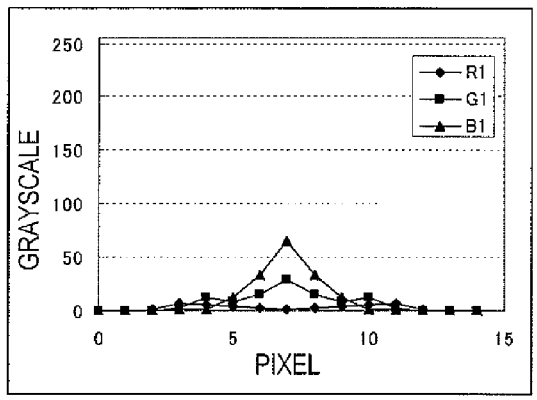
Figure 6:
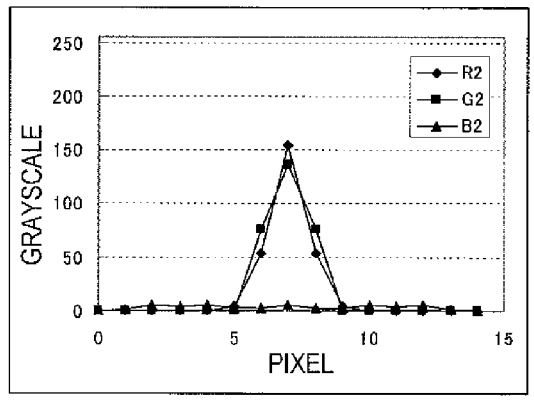
Figure 6:
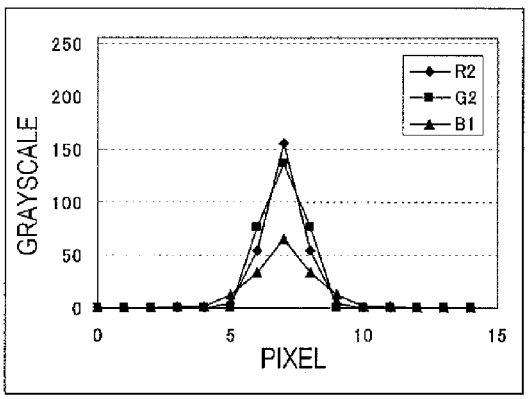
Figure 6:
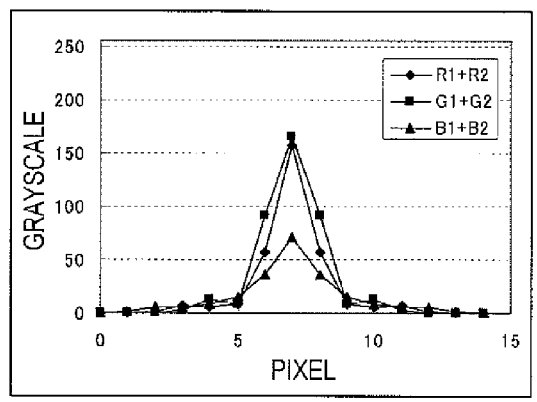

FIG. 6(a) is a graph showing the color-by-color point spread functions on and around the optical axis in a first color image that has been provided by the first optical system 10. FIG. 6(b) is a graph showing the color-by-color point spread functions on and around the optical axis in a second color image that has been provided by the second optical system 20. FIG. 6(c) is a graph showing the point spread functions in a situation where a color component with the higher degree of sharpness is chosen on a color-by-color basis from the first and second color images. FIG. 6(d) is a graph showing the point spread functions in a situation where first and second color images are added together on a color-by-color basis.

Figure 7:
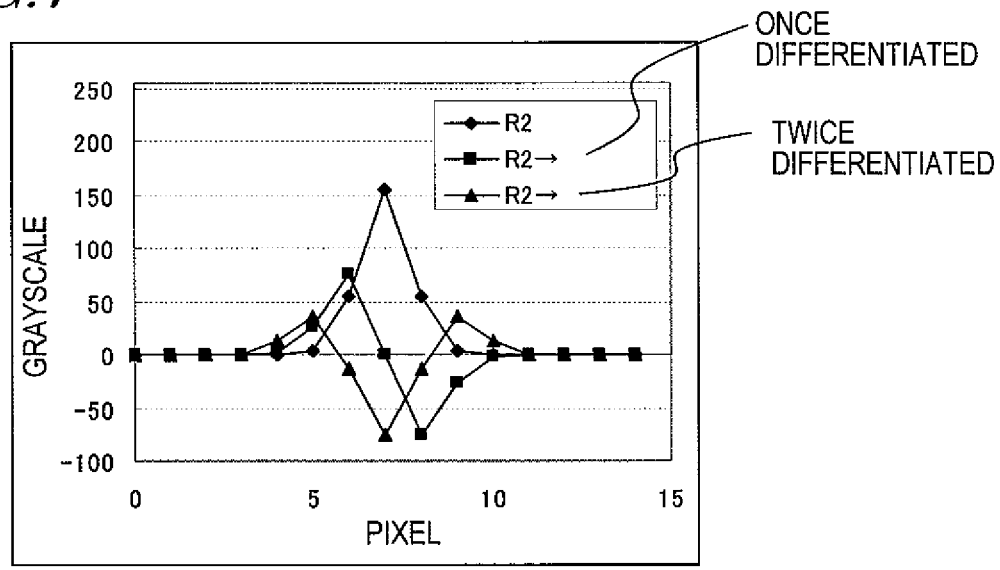
Figure 7:
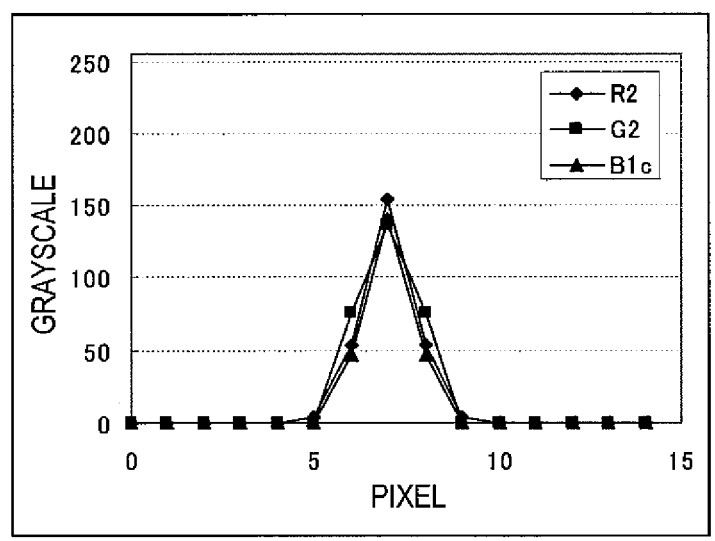

FIG. 7(a) is a graph showing the point spread function of red in the second optical system 20, a distribution obtained by subjecting that point spread function to a differentiation once, and a distribution obtained by subjecting the point spread function to a differentiation twice. FIG. 7(b) is a graph showing the point spread function that is obtained by subtracting the twice-differentiated point spread function of red in the second optical system 20 from the point spread function of blue of the first optical system 10.

Figure 8:
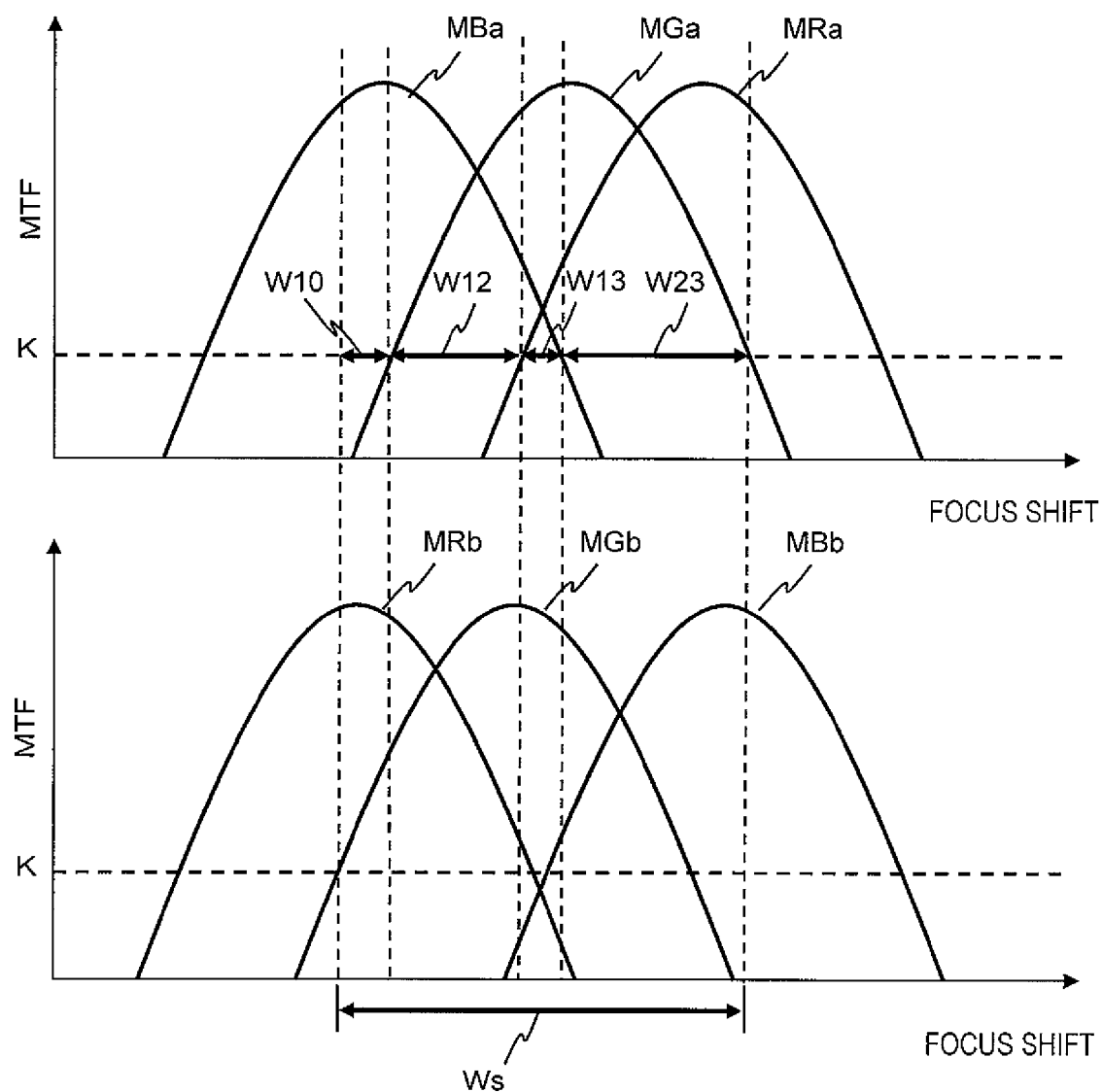

FIG. 8 shows graphs representing the through focus MTF properties of the first and second optical systems 10 and 20.

Figure 9:
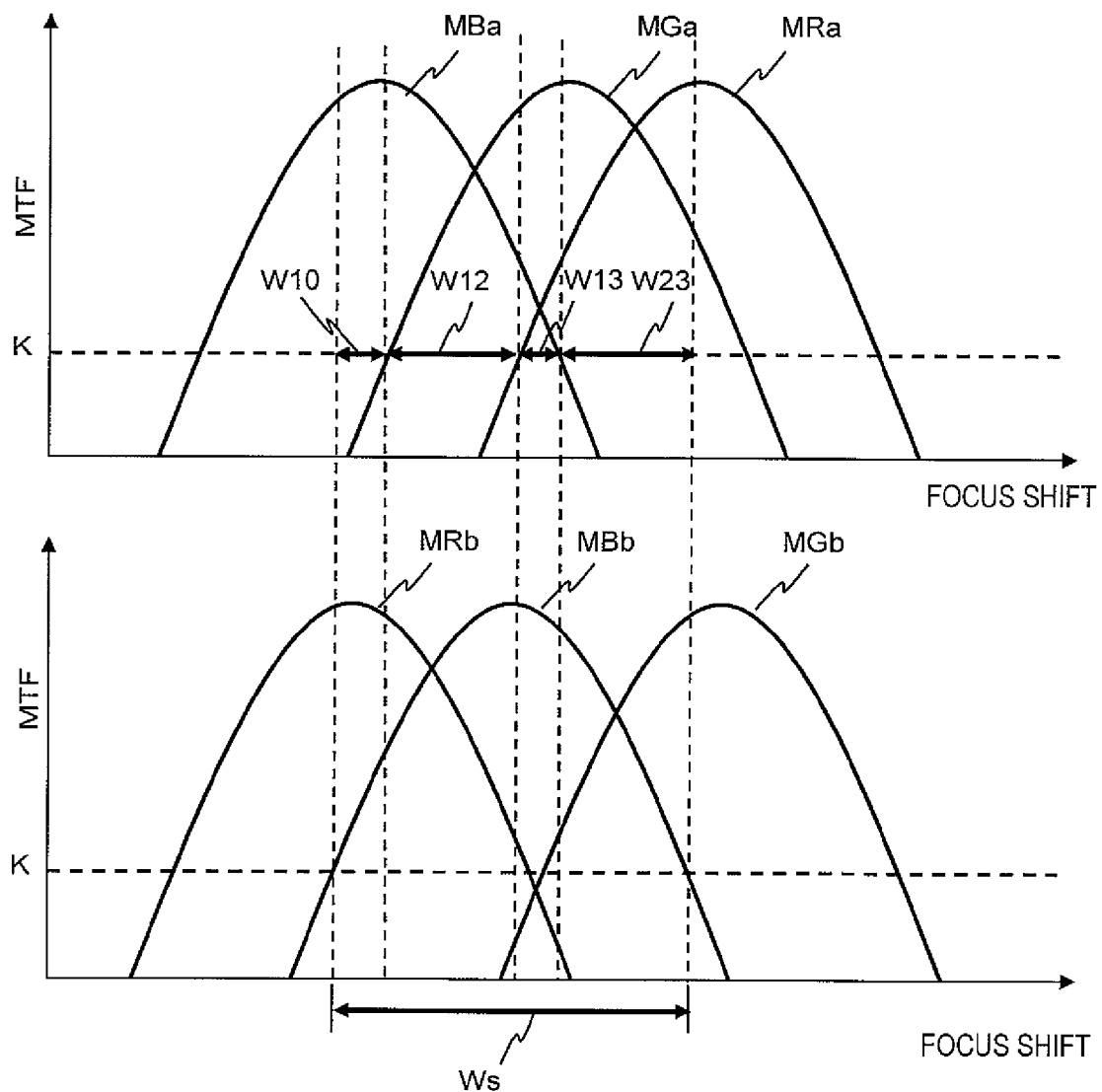

FIG. 9 shows graphs representing the through focus MTF properties of first and second optical systems 10a and 20a.

Figure 10:
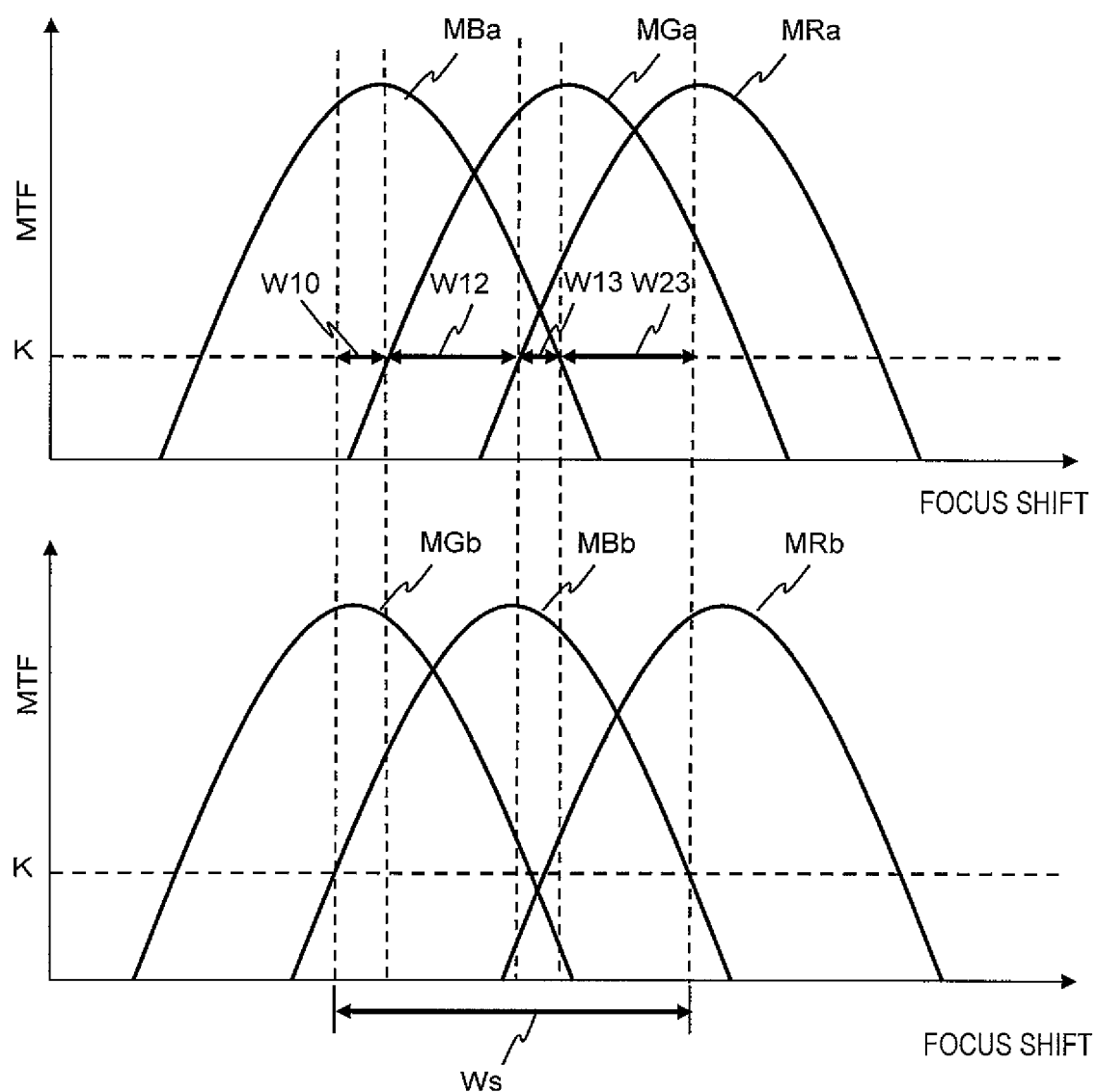

FIG. 10 shows graphs representing the through focus MTF properties of first and second optical systems 10b and 20b.

Figure 11:
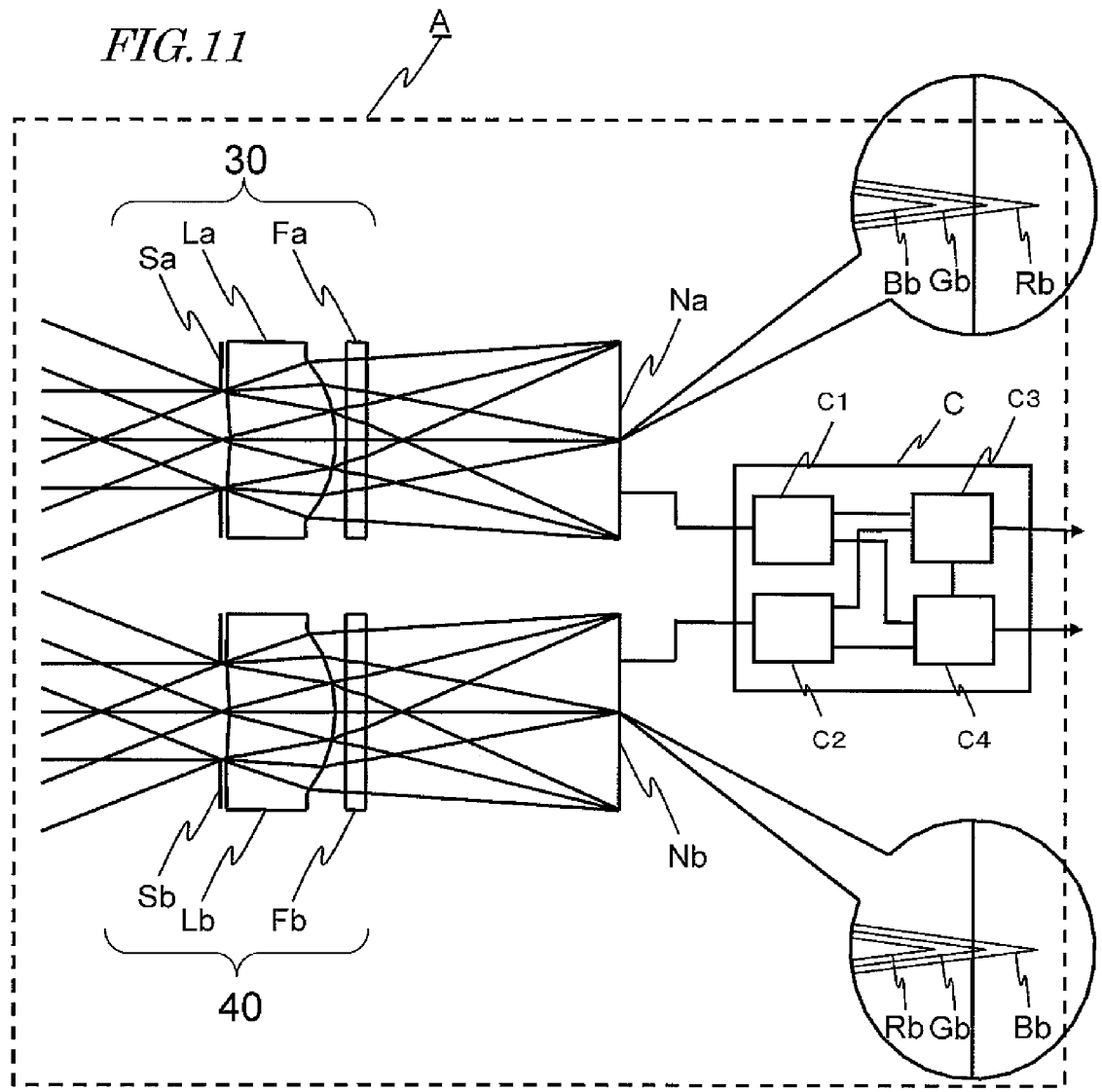

FIG. 11 is a schematic representation illustrating a second preferred embodiment of an image capture device A according to the present invention.

Figure 12:
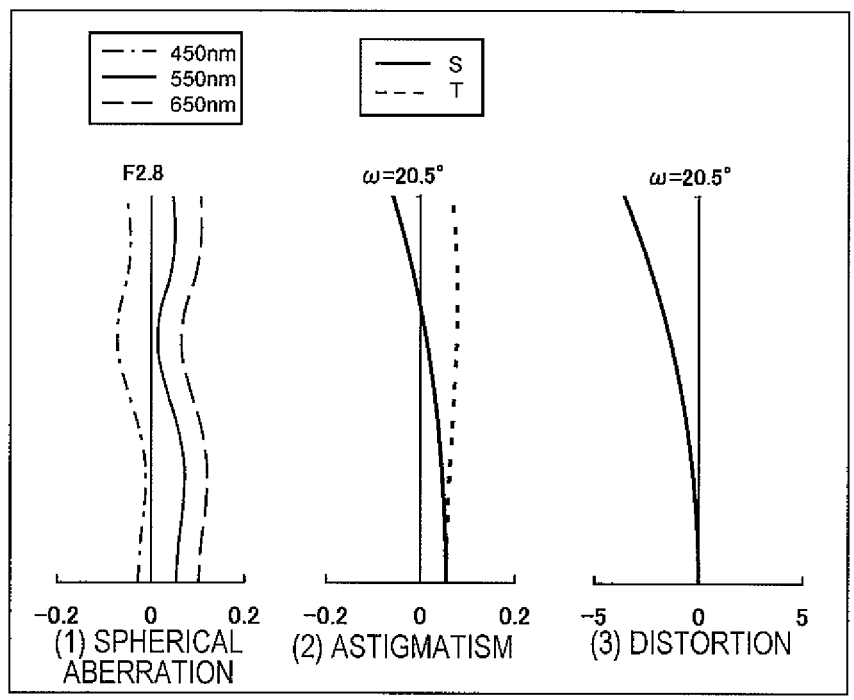
Figure 12:
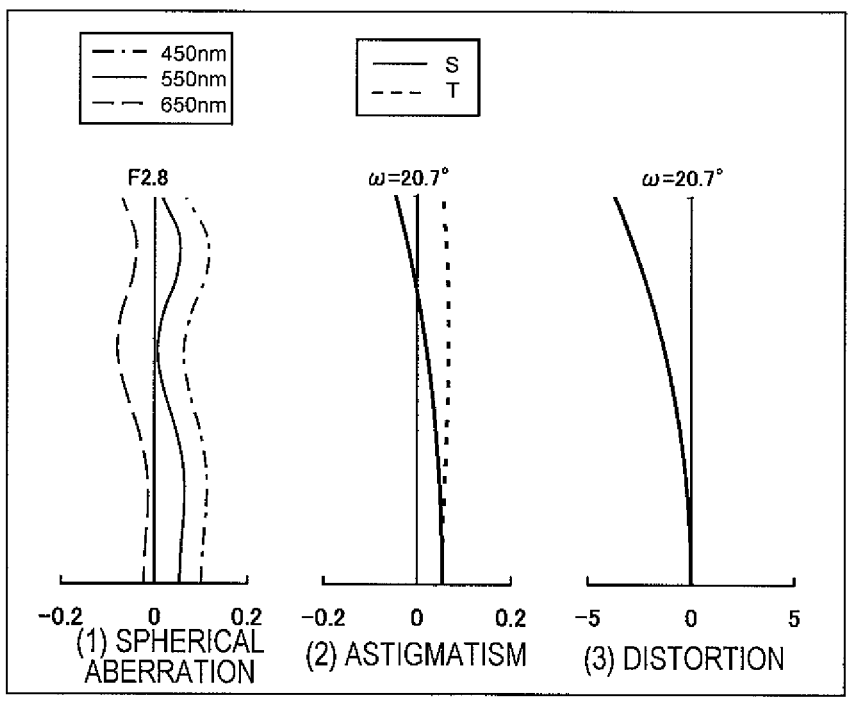

Portions (1), (2) and (3) of FIG. 12(a) are graphs respectively showing the spherical aberration, astigmatism and distortion of a first optical system 30. Portions (1), (2) and (3) of FIG. 12(b) are graphs respectively showing the spherical aberration, astigmatism and distortion of a second optical system 40.

Figure 13:
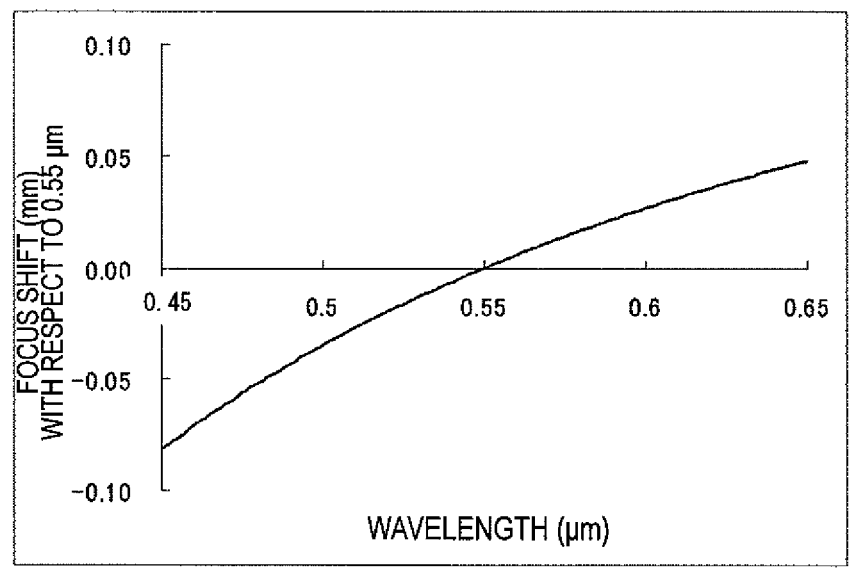
Figure 13:
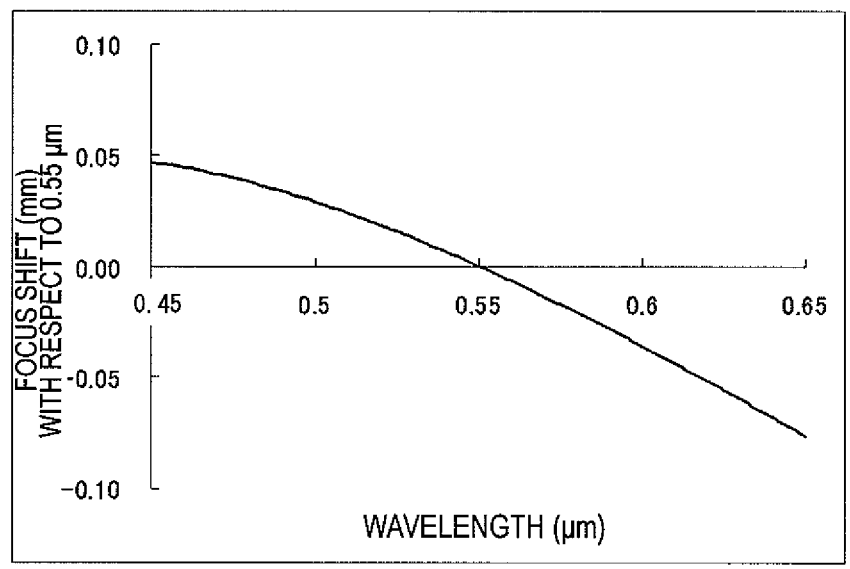

FIGS. 13(a) and 13(b) are graphs showing the longitudinal chromatic aberrations of the first and second optical systems 30 and 40, respectively.

Figure 14:
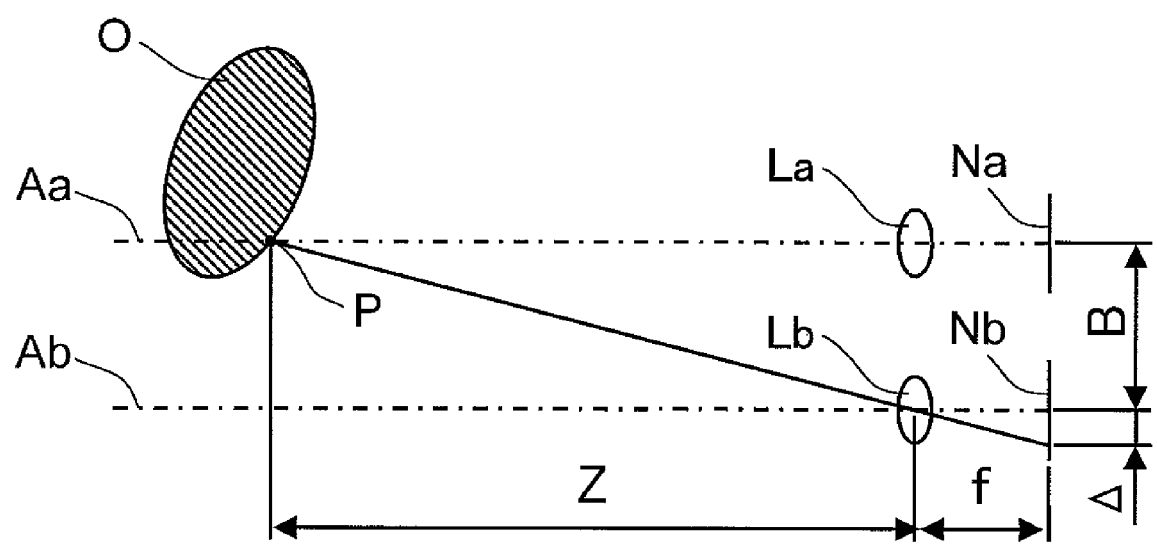

FIG. 14 illustrates how in principle a rangefinder carries out triangulation.

Figure 15:
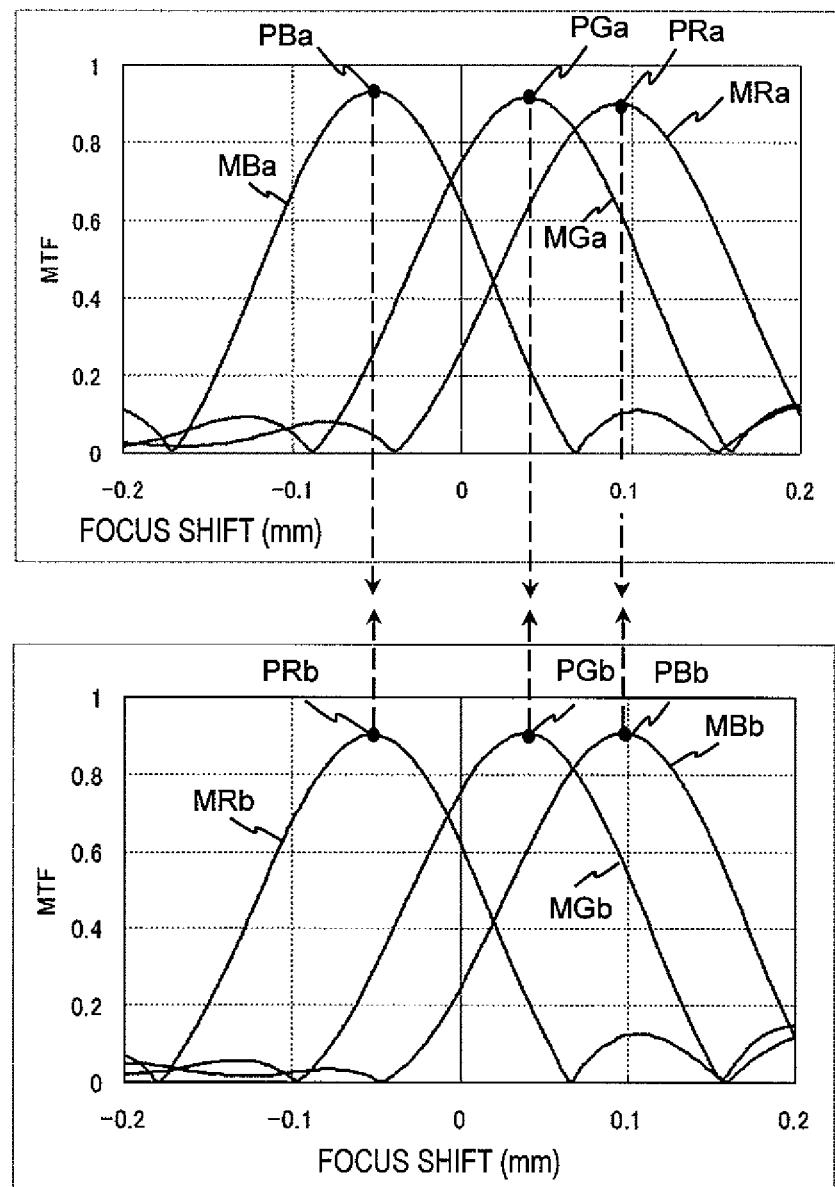

FIG. 15 shows graphs representing the through focus MTF properties of the first and second optical systems 30 and 40.

Figure 16:
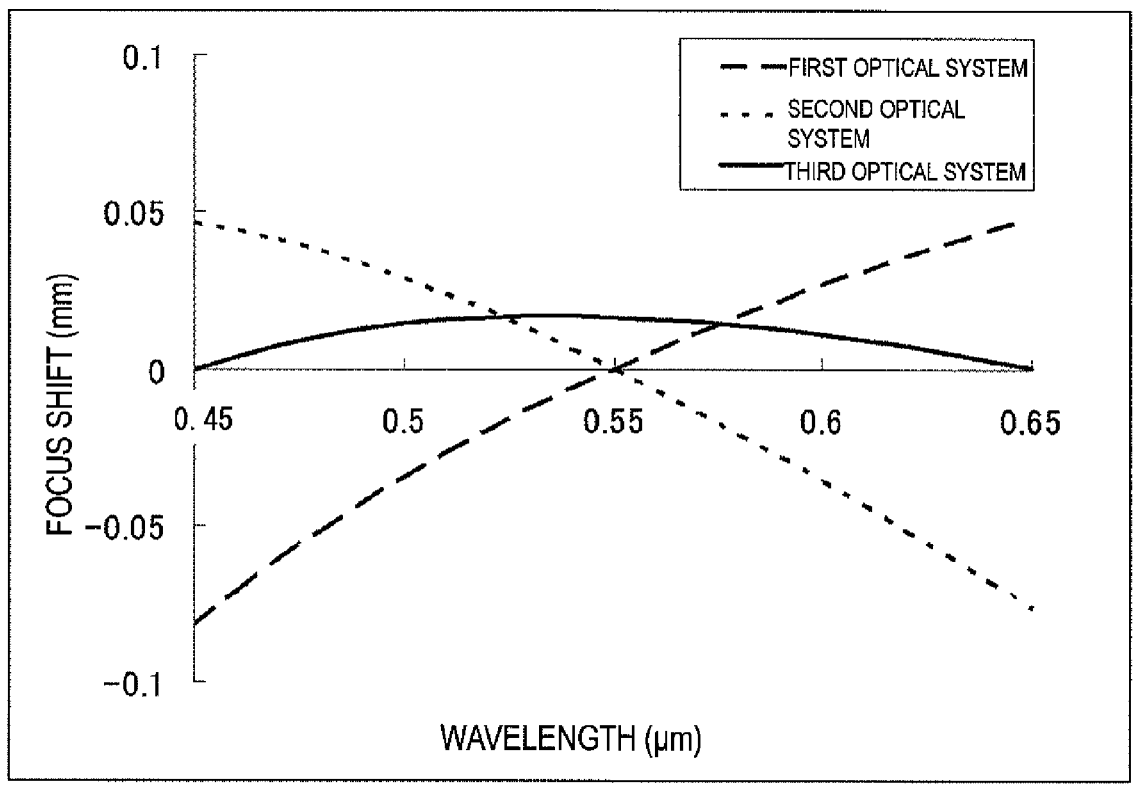

FIG. 16 is a graph showing the longitudinal chromatic aberrations of three or more optical systems that are included in the same image capture device.

DESCRIPTION OF EMBODIMENTS

Hereinafter, preferred embodiments of an image capture device according to the present invention will be described with reference to the accompanying drawings.

Embodiment 1

Figure 1:
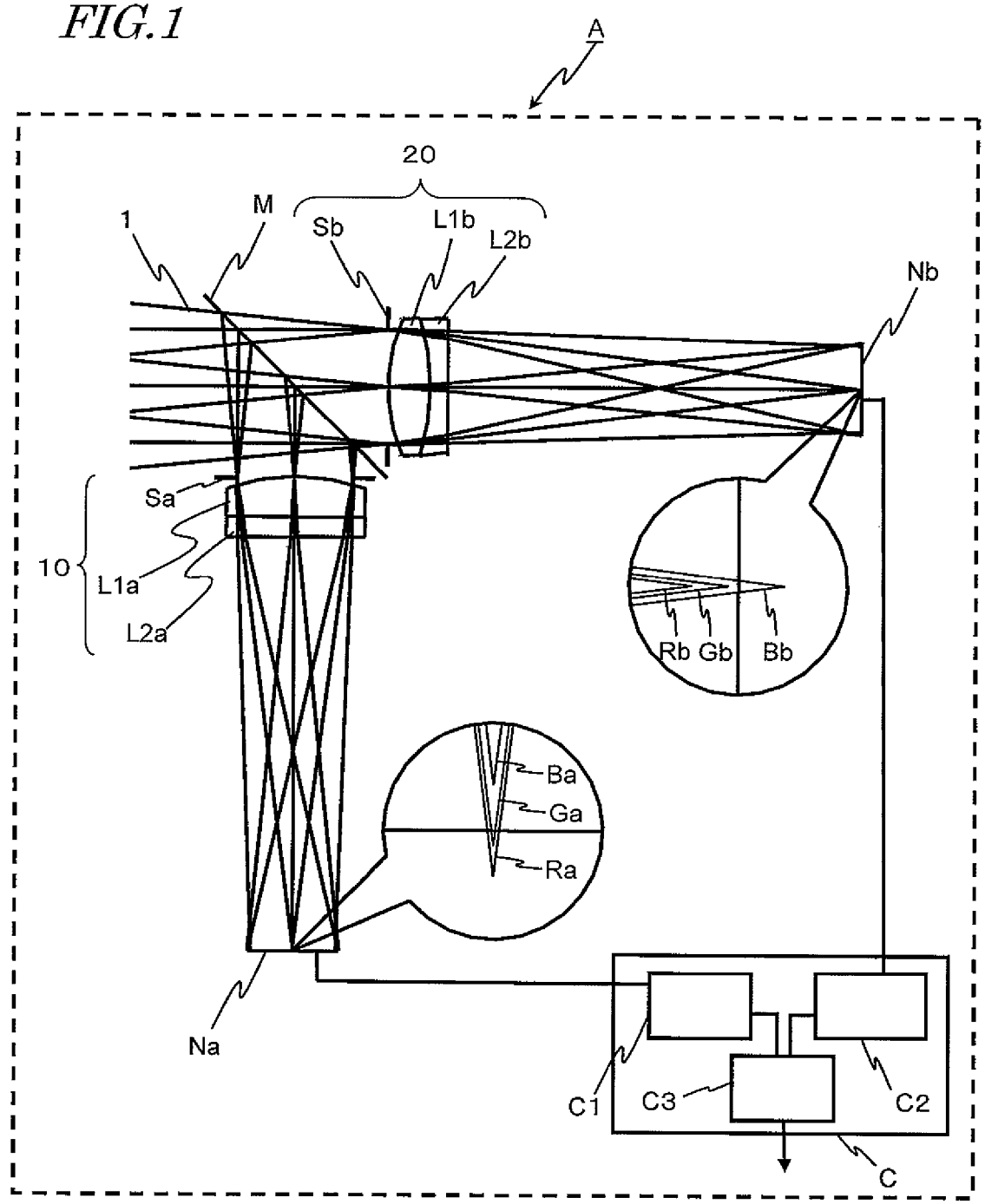
FIG. 1 is a schematic representation illustrating a first preferred embodiment of an image capture device A according to the present invention.

FIG. 1 is a schematic representation illustrating a first preferred embodiment of an image capture device A according to the present invention. The image capture device A of this preferred embodiment includes a first optical system 10, a first image capturing region Na on which the light that has been transmitted through the first optical system 10 is incident, a second optical system 20, a second image capturing region Nb on which the light that has been transmitted through the second optical system 20 is incident, and an arithmetic processing section C for getting images from the first and second image capturing regions Na and Nb. The first optical system 10 is made up of a stop Sa and two lenses L1a and L2a, which share the same optical axis. The second optical system 20 is made up of a stop Sb and two lenses L1b and L2b, which also share the same optical axis.

If light is incident on the lenses L1a and L2a of the first optical system 10, the image forming positions of blue (B), green (G) and red (R) rays are formed in this order on the optical axis of the lenses L1a and L2a so as to approach the image surface (i.e., go toward the first image capturing region Na from the lenses L1a and L2a) due to a longitudinal chromatic aberration.

On the other hand, the lenses L1b and L2b of the second optical system 20 have a different longitudinal chromatic aberration from the lenses L1a and L2a of the first optical system 10. If light is incident on the lenses L1b and L2b of the second optical system 20, the image forming positions of red, green and blue rays are formed in this order on the optical axis of the lenses L1b and L2b so as to approach the image surface (i.e., go toward the second image capturing region Nb from the lenses L1b and L2b).

Since the first and second optical systems 10 and 20 have mutually different longitudinal chromatic aberrations, the RGB color components of an image generated in the first image capturing region Na have different degrees of sharpness from those of an image generated in the second image capturing region Nb. By taking advantage of such a difference, it may be determined, on a color-by-color basis, which of first and second color images that have been generated in the first and second image capturing regions Na and Nb has the sharper R, G or B component and a combination of the sharper RGB color components may be used. Then, an output image with such a combination of color components with the higher sharpness (or resolution) can be generated.

It should be noted that the light rays to be incident on the first and second optical systems 10 and 20 do not always have to be in the three colors of blue (B), green (G) and red (R). That is to say, the incident light rays may be in two, or even only one, of these three colors. If the first and second color images do not have all of these red, blue and green components, the sharper color component may be used with respect to each of the colors included in those images. Then, the output image generated can have the higher sharpness with respect to each of the colors included. And such processing can get done by the arithmetic processing section C.

Generally speaking, the sharper an image gets, the less blurred that image gets. That is why the difference in luminance (or grayscale) between two adjacent small areas should ordinarily widen as the sharpness increases. For that reason, according to this preferred embodiment, the absolute value of the difference between the luminance value of a predetermined small area of the image obtained and that of one of its adjacent small areas is used to determine whether the sharpness is high or low.

Hereinafter, the image capture device A of this preferred embodiment will be described in further detail with reference to FIG. 1 again.

In the image capture device A of this preferred embodiment, a light-splitting member M is arranged between the lens L1a of the first optical system 10 and the lens Lib of the second optical system 20. The light-splitting member M may be a half mirror, for example, which splits the light 1 that has come from the subject into two light beams and leads those two light beams to the lens L1a of the first optical system 10 and the lens L1b of the second optical system 20, respectively. These lenses L1a and L1b are arranged so that their optical axes intersect with each other at right angles and that their optical axis defines an angle of 45 degrees with respect to the specular surface of the light-splitting member M. Part of the light that has been incident on the light-splitting member M is reflected from the light-splitting member M and then enters the lens L1a through the stop Sa of the first optical system 10. On the other hand, the rest of the light that has been incident on the light-splitting member M is not reflected from, but transmitted through, the light-splitting member M and then enters the lens Lib through the stop Sb of the second optical system 20. The light that has been transmitted through the two lenses L1a and L2a of the first optical system 10 then strikes the first image capturing region Na. Meanwhile, the light that has been transmitted through the two lenses L1b and L2b of the second optical system 20 then strikes the second image capturing region Nb. Since the light that has come from the same subject reaches both of the first and second image capturing regions Na and Nb in this manner, substantially the same color components are included in the images that are projected onto those image capturing regions Na and Nb.

The first and second image capturing regions Na and Nb are connected to the arithmetic processing section C, which processes the two color images that have been supplied from the first and second image capturing regions Na and Nb (and will be referred to herein as a "first color image" and a "second color image", respectively), thereby generating a single color image (as an output image).

As described above, the first and second optical systems 10 and 20 have mutually different longitudinal chromatic aberrations. Thus, the order in which these light rays are condensed and their image forming positions can be controlled by adjusting the shapes, materials and arrangements of their lenses.

The following Tables 1 and 2 summarize design data for the first and second optical systems 10 and 20 of the image capture device A shown in FIG. 1. In Tables 1 and 2, ri denotes the paraxial radius of curvature (mm) of the surfaces, di denotes the interval (mm) between the respective centers of the surfaces, nd denotes the d-line refractive index of the lens or the filter, and vd denotes the Abbe number of the d line of the lens or the filter.

TABLE 1

Lens data: focal length = 10 mm, F value = 4,
λ = 550 nm, field of view 2ω = 11.47
degrees, and effective image circle = φ2 mm

| Surface No. | ri | di | nd | vd |
|---|---|---|---|---|
| Object | ∞ | 1000 | — | — |
| R1 surface (stop) | 4.354157 | 0.9 | 1.5168 | 64.2 |
| R2 surface | −305.619392 | 0.4 | 1.755 | 27.6 |
| R3 surface | 37.307164 | 8.98 | — | — |
| Image surface | ∞ | — | — | — |

TABLE 2

Lens data: focal length = 10 mm, F value = 4,
λ = 550 nm, field of view 2ω = 11.3
degrees, and effective image circle = φ2 mm

| Surface No. | ri | di | nd | vd |
|---|---|---|---|---|
| Object | ∞ | 1000 | — | — |
| R1 surface (stop) | 3.809238 | 0.9 | 1.5168 | 64.2 |
| R2 surface | −5.29017 | 0.4 | 1.755 | 27.6 |
| R3 surface | −105.871253 | 9.06 | — | — |
| Image surface | ∞ | — | — | — |

Portions (1), (2) and (3) of FIG. 2(a) respectively show the spherical aberration, astigmatism and distortion of the first optical system 10. On the other hand, portions (1), (2) and (3) of FIG. 2(b) respectively show the spherical aberration, astigmatism and distortion of the second optical system 20.

FIGS. 3(a) and 3(b) show the longitudinal chromatic aberrations of the first and second optical systems 10 and 20, respectively. In FIGS. 3(a) and 3(b), the abscissa represents the wavelength of the light, while the ordinate represents the focus shift indicating how much the image forming position has shifted with respect to the focal point of a green light ray with a wavelength of 0.55 μm (i.e., when the focal point of the green light ray is supposed to be 0.00). As can be seen from FIG. 3(a), in the first optical system 10, the shorter the wavelength of the light, the closer to the subject (i.e., the closer to the lenses L1a and L2a) the light is focused. That is to say, in the first optical system 10, the image forming positions of blue, green and red rays are formed in this order on the optical axis so as to go toward the image surface (i.e., from the lenses L1a and L2a to the first image capturing region Na). On the other hand, as can be seen from FIG. 3(b), in the second optical system 20, the shorter the wavelength of the light, the closer to the second image capturing region Nb the light is focused on the optical axis. That is to say, in the second optical system 20, the image forming positions of red, green and blue rays are formed in this order on the optical axis so as to go toward the second image capturing region Nb from the lenses L1b and L2b.

As shown in FIG. 1, the lenses L1a and L2a are a convex lens and a concave lens, respectively. Likewise, the lenses L1b and L2b are a convex lens and a concave lens, respectively. Such a pair of concave and convex lenses is ordinarily used to correct the longitudinal chromatic aberration of the lenses. According to this preferred embodiment, however, the first optical system 10 is designed so that the longitudinal chromatic aberration is corrected insufficiently but the second optical system 20 is designed so that the longitudinal chromatic aberration is corrected excessively. It should be noted that the concavo-convex shapes of lenses L1a, L2a, L1b and L2b of this preferred embodiment do not always have to be the combinations shown in FIG. 1.

The arithmetic processing section C includes first and second sharpness detecting sections C1 and C2 and an image generating section C3 that generates an output image. The first sharpness detecting section C1 detects, on a predetermined area basis, the color-by-color sharpness of the image supplied from the first image capturing region Na. On the other hand, the second sharpness detecting section C2 detects, on a predetermined area basis, the color-by-color sharpness of the image supplied from the second image capturing region Nb. The image generating section C3 generates an output image based on the degrees of sharpness that have been calculated by the first and second sharpness detecting sections C1 and C2. In this case, the arithmetic processing section C may be implemented as either a hardware circuit or a software program as long as it can carry out the predetermined arithmetic processing.

The sharpness of the image that has been produced in the first or second image capturing region Na or Nb varies according to the distance to the subject. And such a variation in sharpness with the subject distance can be represented by the MTF of the first or second optical system 10 or 20. As used herein, the "MTF" is a property of a lens representing how faithfully the contrast of a subject can be reproduced on the image surface. Therefore, the higher the MTF value, the higher the degree of sharpness should be. According to this preferred embodiment, the MTF is used for designing the first and second optical systems 10 and 20 in order to achieve an intended degree of sharpness. Hereinafter, the through focus MTF properties of the first and second optical systems 10 and 20, with which the intended degree of sharpness can be achieved, will be described.

FIG. 4 shows graphs representing the through focus MTF properties of the first and second optical systems 10 and 20. In FIG. 4, the upper and lower graphs represent the through focus MTF properties of the first and second optical systems 10 and 20, respectively. Also, in FIG. 4, the abscissa represents the focus shift and the ordinate represents the MTF at a spatial frequency of 30 Lp/mm. In the graph representing the property of the first optical system 10, MBa, MGa, and MRa represent the through focus MTF properties of blue, green and red components, respectively, and PBa, PGa and PRa represent their peaks. Likewise, in the graph representing the property of the second optical system 20, MRb, MGb, and MBb represent the through focus MTF properties of red, green and blue components, respectively, and PRb, PGb and PBb represent their peaks. According to this preferred embodiment, the optical systems are designed so that the magnitudes of focus shift of PBa and PRb are substantially equal to each other and that the magnitudes of focus shift of PRa and PBb are substantially equal to each other. However, the optical systems do not always have to be designed so that those peaks are located at almost the same position.

FIG. 5 schematically illustrates the through focus MTF properties of the first and second optical systems 10 and 20 on a subject distance basis. In FIG. 5, it means that the higher the MTF on an image capturing plane, the higher the degree of sharpness will be.

Generally speaking, the shorter the subject distance from a lens is, the more distant from the lens (i.e., the more distant from the subject) the light that has passed through the lens is focused. That is why if the subject distances are classified into short, middle and long distances as shown in FIG. 5, the peaks of the MTF properties go father out from the lens in the order of the short, middle and long distances. In this manner, the MTF value of each of the colors of the image generated in the first or second image capturing region Na or Nb varies according to the subject distance.

As shown in FIG. 5, if the subject distance is short, the MTF value of the blue ray 1Bn of the first optical system 10 is greater than that of the blue ray of the second optical system 20. Meanwhile, the MTF value of the green ray 2Gn of the second optical system 20 is greater than that of the green ray of the first optical system 10. And the MTF value of the red ray 2Rn of the second optical system 20 is greater than that of the red ray of the first optical system 10. If one of the two light rays that has the greater MTF value is chosen from one of the two optical system with respect to each color, then the blue ray 1Bn of the first optical system 10 and the green and red rays 2Gn and 2Rn of the second optical system 20 are chosen.

According to the same method, if the subject distance is middle, the red ray 1Rm of the first optical system 10 and the green and blue rays 2Gm and 2Bm of the second optical system 20 are chosen. And if the subject distance is long, the red and green rays 1Rf and 1Gf of the first optical system 10 and the blue ray 2Bf of the second optical system 20 are chosen.

The first and second optical systems 10 and 20 are designed so as to have the through focus MTF properties shown in FIG. 5. In carrying out the design process, an MTF value at which an intended degree of sharpness can be achieved is set as a boundary value. And with respect to each color of the images produced by the first and second optical systems 10 and 20, a subject distance range in which the greater MTF value is over the boundary value (i.e., a range that covers the short, middle and long distances shown in FIG. 5) roughly represents the depth of field. It should be noted that the "boundary value" refers to the predetermined value K shown in FIG. 8, which will be described in detail later.

The MTF represents how faithfully the contrast of a subject can be reproduced on an image surface. That is why to calculate the MTF value, the spatial frequency of the subject is needed. For that reason, when an image is actually captured, the MTF value cannot be detected directly from an arbitrary image. Therefore, during an actual image capturing session, a luminance value is used to determine whether the sharpness is high or low. Generally speaking, the sharper an image gets, the less blurred that image gets. That is why the difference in luminance between two adjacent small areas should ordinarily widen as the sharpness increases.

Specifically, first of all, the first sharpness detecting section C1 calculates the luminance value of a predetermined small area of an image that has been captured in the first image capturing region Na and that of another small area that is adjacent to that predetermined small area, and then calculates the absolute value of the difference between these two luminance values. In the same way, the second sharpness detecting section C2 also calculates the absolute value of the difference between the two luminance values with respect to the image that has been captured in the second image capturing region Nb. Next, the image generating section C3 compares the two absolute values thus calculated with respect to the images that have been captured in the first and second image capturing regions Na and Nb and can determine that one of the two images captured in the first and second image capturing regions Na and Nb that has the greater absolute value should have the higher degree of sharpness. And the image generating section C3 makes such a decision on each of red, blue and green components on each predetermined small area.

In a situation where the first and second optical systems 10 and 20 are designed as described above, if the subject is located within the depth of field, one of the two images captured in the first and second image capturing regions Na and Nb, of which the absolute value of the difference between the luminance values is greater than the other, will have a degree of sharpness falling within a predetermined range. Consequently, just by comparing the absolute values of the differences between the luminance values to each other, an image with the higher degree of sharpness can be chosen with respect to each color even without measuring the subject distance.

Alternatively, the degree of sharpness may also be calculated based on a frequency spectrum, which has been obtained by subjecting the luminance value of an image block of a predetermined size to a Fourier transform. In that case, the response value at a predetermined spatial frequency can be obtained as the degree of sharpness. That is to say, by comparing the response values at the predetermined spatial frequency, it can be determined whether the degree of sharpness of the image is high or low. Since an image is a two-dimensional one, a method for calculating the degree of sharpness by two-dimensional Fourier transform is preferred.

According to this preferred embodiment, the first and second sharpness detecting sections C1 and C2 in the arithmetic processing section C may actually calculate the degrees of sharpness of the first and second optical systems 10 and 20 and then choose one of the two optical systems that has the higher degree of sharpness with respect to each color component.

Examples of methods for synthesizing a color image include a method in which each color image component with the higher degree of sharpness is chosen on a color-by-color basis and then those color components chosen are combined together to generate a single output image as described above and a method in which two color images are added and combined together on a color-by-color basis. According to any of these methods, an output image, which still has a high degree of sharpness even if the subject distance has varied, can be generated.

FIG. 6(a) is a graph showing the color-by-color point spread functions on and around the optical axis in a first color image that has been provided by the first optical system 10 at a predetermined distance. On the other hand, FIG. 6(b) is a graph showing the color-by-color point spread functions on and around the optical axis in a second color image that has been provided by the second optical system 20. As can be seen from FIGS. 6(a) and 6(b), the first and second optical systems 10 and 20 have mutually different point spread functions.

FIG. 6(c) is a graph showing the point spread functions in a situation where a color component with the higher degree of sharpness is chosen on a color-by-color basis from the first and second color images. The blue component B1 shown in FIG. 6(a) has a higher degree of sharpness than the blue component B2 shown in FIG. 6(b). On the other hand, the red and green components R1 and G1 shown in FIG. 6(a) have lower degrees of sharpness than the red and green components R2 and B2 shown in FIG. 6(b). That is why if each color component with the higher degree of sharpness is chosen on a color-by-color basis, then an image is generated based on the red, green and blue components R2, G2 and B1, respectively, as shown in FIG. 6(c). By adopting such a synthesizing technique, a higher degree of sharpness can be achieved than the one achieved by the single optical system as shown in FIGS. 6(a) and 6(b).

FIG. 6(d) is a graph showing the point spread functions in a situation where first and second color images are added together on a color-by-color basis. Even if such a synthesizing technique is adopted, a higher degree of sharpness can also be achieved than the one achieved by the single optical system as shown in FIGS. 6(a) and 6(b).

It may be determined, based on a property of the subject, which of the two synthesizing techniques shown in FIGS. 6(c) and 6(d) should be adopted. For example, if the subject is a bright one, the synthesizing technique shown in FIG. 6(c) may be adopted. On the other hand, if the subject is a dark one, then the synthesizing technique shown in FIG. 6(d) may be adopted.

According to the synthesizing techniques shown in FIGS. 6(c) and 6(d), even after the image components have been synthesized together, the blue component still has a lower degree of sharpness than the green or red component. In that case, by reflecting the highest degree of sharpness of the red component on that of the blue component, the blue component can have almost as high a degree of sharpness as each of the other color components. Hereinafter, it will be described specifically how to do such leveling.

FIG. 7(a) is a graph showing the point spread function of red of the second optical system 20, a distribution obtained by subjecting that point spread function to a differentiation once, and a point spread function obtained by subjecting the point spread function to a differentiation twice. The gradient of the once-differentiated point spread function is as steep as the distribution yet to be differentiated. On the other hand, if the point spread function is subjected to the differentiation twice, the variation of the point spread function yet to be differentiated is emphasized, and therefore, the twice-differentiated distribution becomes an edge detection filter. That is why by subtracting the twice-differentiated point spread function of red of the second optical system 20 from the point spread function of blue of the first optical system 10, the degree of sharpness of the blue component can be increased. As a result, a color image, of which every color component has a sufficiently high degree of sharpness, can be generated as shown in FIG. 7(b).

Optionally, the degree of sharpness of the blue component can also be increased even by subtracting the twice-differentiated distribution of the blue component from the point spread function of blue. If the blue image component is significantly blurred, however, no sharp edge can still be detected even by subjecting that blurred image component to the differentiation twice, and therefore, the degree of sharpness cannot be increased sufficiently. For that reason, it is preferred that the twice-differentiated distribution of a different color component with a high degree of sharpness be subtracted from the point spread function of blue as described above.

In the preferred embodiment described above, the processing for sharpening the point spread functions is supposed to be carried out one-dimensionally for the sake of simplicity. Actually, however, an image is a two-dimensional one, and therefore, the sharpening processing should also be done two-dimensionally. Also, in the preferred embodiment described above, the twice-differentiated distribution is just subtracted as it is. Optionally, the twice-differentiated distribution may also be multiplied by a predetermined coefficient and then the product may be subtracted from the point spread function.

Next, the longitudinal chromatic aberration ranges of the first and second optical systems 10 and 20 will be described. In FIG. 8, the upper and lower graphs show the through focus MTF properties of the first and second optical systems 10 and 20, respectively. Also, in FIG. 8, the ordinate represents the MTF value at the predetermined spatial frequency of red, green or blue component, while the abscissa represents the position on the optical axis.

In FIG. 8, the curves MBa, MGa and MRa represent the MTF properties of the blue, green and red components, respectively, and overlap with each other. On the other hand, the curves MRb, MGb and MBb represent the MTF properties of the red, green and blue components, respectively, and also overlap with each other.

As shown in FIG. 8, first, second, third and fourth ranges W10, W12, W13 and W23 are defined on the axis of abscissas. The second range W12 represents image forming positions in a situation where the subject distance is longer than in the first range W10. Likewise, the third range W13 represents image forming positions in a situation where the subject distance is longer than in the first and second ranges W10 and W12. And the fourth range W23 represents image forming positions in a situation where the subject distance is longer than in the first, second and third ranges W10, W12 and W13.

In the third range W13, each of the red, green and blue components of the first optical system 10 has an MTF value that is equal to or greater than a predetermined value K. Alternatively, the MTF value may also be equal to or greater than the predetermined value K in every color component of the second optical system 20, not the first optical system 10.

In the first range W10, the blue component of the first optical system 10 has an MTF value that is equal to or greater than the predetermined value K and the green and red components thereof have MTF values that are less than the predetermined value K. On the other hand, the red and green components of the second optical system 20 have MTF values that are equal to or greater than the predetermined value K.

In the second range W12, the blue and green components of the first optical system 10 have MTF values that are equal to or greater than the predetermined value K and the red component thereof has an MTF value that is less than the predetermined value K. On the other hand, the red component of the second optical system 20 has an MTF value that is equal to or greater than the predetermined value K.

In the fourth range W23, the green and red components of the first optical system 10 have MTF values that are equal to or greater than the predetermined value K and the blue component thereof has an MTF value that is less than the predetermined value K. On the other hand, the blue component of the second optical system 20 has an MTF value that is equal to or greater than the predetermined value K.

According to this preferred embodiment, in the range Ws, every color component can have an MTF value that is equal to or greater than the predetermined value K in the first or second optical system 10 or 20. By generating an image based on these pieces of color information, the degree of sharpness of the image can be increased in the range Ws.

Suppose an image capture device has only the first optical system 10. Such a device can obtain an image with a high degree of sharpness only in the third range W13 shown in FIG. 8. On the other hand, by using two optical systems, this preferred embodiment can extend the depth of focus significantly compared to such an image capture device that has only one optical system, and therefore, can achieve a sufficiently great depth of field. On top of that, even when a subject in a single color such as a red, green or blue subject is going to be shot on a black background, either the image data provided by the first optical system 10 or the one provided by the second optical system 20 may be used to generate an image with a high degree of sharpness over a broader range than in a situation where only one optical system is used.

In the example illustrated in FIG. 8, the order in which respective color rays are condensed in the first optical system 10 is the reverse of the order in which those color rays are condensed in the second optical system. However, according to this preferred embodiment, those color rays may also be condensed in any other order. Hereinafter, an example in which those light rays are condensed in a different order than in FIG. 8 will be described. FIG. 9 is a graph showing the respective through focus MTF properties of first and second optical systems 10a and 20a. In the first optical system 10a, blue, green and red rays are condensed in this order so as to approach the image surface (i.e., go toward the image capturing region from the lenses). In the second optical system 20a, on the other hand, red, blue, and green rays are condensed in this order so as to approach the image surface. That is to say, in this case, the color rays condensed closest to the lenses, the color rays condensed closest to the image surface, and the color rays condensed halfway between them all disagree with each other in the first and second optical systems 10a and 20a.

In that case, in the first range W10, the green component has an MTF value that is less than the predetermined value K in the first and second optical systems 10a and 20a. That is why the degree of sharpness of the green component cannot be increased in the first range W10.

In the second range W12, the blue and green components of the first optical system 10a have MTF values that are equal to or greater than the predetermined value K and the red component thereof has an MTF value that is less than the predetermined value K. On the other hand, the red component of the second optical system 20a has an MTF value that is equal to or greater than the predetermined value K.

In the third range W13, the red, green and blue components of the first optical system 10a all have MTF values that are equal to or greater than the predetermined value K. Alternatively, every color component may have an MTF value that is equal to or greater than the predetermined value K in the second optical system 20a, instead of the first optical system 10a.

In the fourth range W23, the green and red components of the first optical system 10a have MTF values that are equal to or greater than the predetermined value K and the blue component thereof has an MTF value that is less than the predetermined value K. On the other hand, the blue component of the second optical system 20a has an MTF value that is equal to or greater than the predetermined value K.

These results reveal that in the example illustrated in FIG. 9, the same condition as in FIG. 8 is satisfied in the second, third and fourth ranges W12, W13 and W23.

Another situation where those light rays are condensed in a different order from the ones shown in FIGS. 8 and 9 will be described. FIG. 10 is a graph showing the respective through focus MTF properties of first and second optical systems 10b and 20b. In the first optical system 10b, blue, green and red rays are condensed in this order so as to approach the image surface (i.e., go toward the image capturing region from the lenses). In the second optical system 20b, on the other hand, green, blue, and red rays are condensed in this order so as to approach the image surface. That is to say, in this case, the color rays condensed closest to the lenses and the color rays condensed halfway are different, but the color rays condensed closest to the image surface are the same, between the first and second optical systems 10b and 20b.

In that case, in the first range W10, the red component has an MTF value that is less than the predetermined value K in the first and second optical systems 10b and 20b. That is why the degree of sharpness of the red component cannot be increased in the first range W10.

In the second range W12, the red component also has an MTF value that is less than the predetermined value K in the first and second optical systems 10b and 20b. That is why the degree of sharpness of the red component cannot be increased in the second range W12, either.

In the third range W13, the red, green and blue components of the first optical system 10b all have MTF values that are equal to or greater than the predetermined value K. Alternatively, every color component may have an MTF value that is equal to or greater than the predetermined value K in the second optical system 20b, instead of the first optical system 10b.

In the fourth range W23, the green and red components of the first optical system 10b have MTF values that are equal to or greater than the predetermined value K and the blue component thereof has an MTF value that is less than the predetermined value K. On the other hand, the blue component of the second optical system 20b has an MTF value that is equal to or greater than the predetermined value K.

These results reveal that in the example illustrated in FIG. 10, the same condition as in FIGS. 8 and 9 is satisfied in the third and fourth ranges W13 and W23.

It should be noted that in the examples illustrated in FIGS. 8, 9 and 10, the respective color rays are supposed to be condensed in the same order (i.e., blue, green and red rays are supposed to be condensed in this order so as to approach the image surface) in the first optical system 10, 10a or 10b so that their difference can be understood easily. However, according to this preferred embodiment, those color rays may also be condensed in any other order in the first optical system 10, 10a or 10b.

If MTF values at the same spatial frequency are compared to each other, the results shown in FIGS. 8 and 9 can be generalized as follows. Specifically, if the first optical system 10 has a longitudinal chromatic aberration that causes respective light rays to be condensed in the order of first, second and third colors toward the image surface, then all of the first, second and third color components will have MTF values that are equal to or greater than the predetermined value in the third range W13 in at least one of the first and second optical systems 10 and 20. In the second range W12, the first and second color components have MTF values that are equal to or greater than the predetermined value in the first optical system 10, and the third color component has an MTF value that is less than the predetermined value in the first optical system 10 and an MTF value that is equal to or greater than the predetermined value in the second optical system 20. And in the fourth range W23, second and third color components have MTF values that are equal to or greater than the predetermined value in the first optical system 10, and the first color component has an MTF value that is less than the predetermined value in the first optical system 10 and an MTF value that is equal to or greater than the predetermined value in the second optical system 20.

However, the conditions such as these are satisfied if the order in which respective color rays are condensed in the first optical system 10 is the reverse of the order in which those rays are condensed in the second optical system 20 (i.e., in the situation illustrated in FIG. 8) or if the color rays condensed closest to the lenses, the color rays condensed closest to the image surface, and the color rays condensed halfway between them all disagree with each other in the first and second optical systems 10 and 20 (i.e., in the situation illustrated in FIG. 9). None of these conditions are satisfied if the color rays condensed closest to the lenses or the color rays condensed closest to the image surface agree with each other in the first and second optical systems 10 and 20 (i.e., in the situation illustrated in FIG. 10). As the first, second and third colors, the colors blue, green and red may be used in any arbitrary combination.

Nevertheless, if the respective color rays are condensed in the order of either red, green and blue or blue, green and red from the lenses toward the image surface in the first and second optical systems 10 and 20 (i.e., in the situation illustrated in FIG. 8), then the peak positions of the three color rays are more distant from each other than in any other situation. Consequently, in such a situation, the depth of focus can be maximized.

Also, in an image sensor with a Bayer arrangement, the predetermined spatial frequency is preferably set to be approximately one-third to one half of a Nyquist frequency, which is calculated by 1/(pixel pitch×2). Furthermore, the predetermined value of the MTF value is preferably set to be approximately 15% or more at the spatial frequency.

According to this preferred embodiment, an output image is generated by determining, on a color-by-color basis, which of the first and second color images that have been supplied from the first and second image capturing regions Na and Nb has a color component with the higher degree of sharpness and using such a color component. As a result, the degree of sharpness of the output image can be increased by a simple method. In addition, the degrees of sharpness of all of the three color components can be greater than the predetermined value K, no matter where the first and second image capturing regions Na and Nb are located from the second range W12 through the fourth range W23 as shown in FIGS. 8 and 9. Consequently, a far greater depth of focus can be achieved than by a conventional method, and therefore, a sufficiently great depth of field can be achieved, too. Furthermore, according to this preferred embodiment, subjects at more varied subject distances can be shot even without using any focusing state detecting means or any focus adjusting means.

According to this preferred embodiment, when a subject in a single color such as a red, green or blue subject is going to be captured on a black background, the degree of sharpness of the subject's color is greater than the predetermined value K in one of the first and second image capturing regions Na and Nb. As a result, an image with a high degree of sharpness can be generated.

In the foregoing description of preferred embodiments, it has been described just how to synthesize color images in regions on the optical axis. As for regions off the optical axis, however, color images are preferably generated after the chromatic aberration of magnification and distortion have been corrected.

In the preferred embodiment described above, it is determined, by comparing the absolute values of the differences between the luminance values (i.e., the degrees of sharpness themselves) to each other, whether the degree of sharpness of an image is high or low. However, this decision may also be made by comparing contrast values to each other. Normally, the higher the contrast value of an image, the higher its degree of sharpness should be. The contrast value may be obtained as the ratio Lmax/Lmin of the maximum luminance Lmax to the minimum luminance Lmin in a predetermined computation block, for example. The degree of sharpness is the difference between the luminance values, while the contrast value is the ratio of the luminance values. In this case, the contrast value may be calculated as the ratio of the maximum luminance at a point to the minimum luminance at another point. Alternatively, the contrast value may also be calculated as the ratio of the average of a number of highest luminance values to that of a number of lowest luminance values. In that case, the arithmetic processing section C will have a first contrast detecting section for detecting the color-by-color contrast with respect to each predetermined area of the image supplied from the first image capturing region Na and a second contrast detecting section for detecting the color-by-color contrast with respect to each predetermined area of the image supplied from the second image capturing region Nb.

Furthermore, in the preferred embodiment described above, each of the first and second optical systems 10 and 20 is supposed to have two lenses. However, this is only an example of the present invention and that arrangement does not always have to be used. Alternatively, each of the two optical systems may have a single lens and a diffraction grating may be arranged on the lens surface of one of the two single lenses.

Embodiment 2

FIG. 11 is a schematic representation illustrating a second preferred embodiment of an image capture device A according to the present invention. The image capture device A of this preferred embodiment includes a first optical system 30, a first image capturing region Na on which the light that has been transmitted through the first optical system 30 is incident, a second optical system 40, a second image capturing region Nb on which the light that has been transmitted through the second optical system 40 is incident, and an arithmetic processing section C for getting images from the first and second image capturing regions Na and Nb. The first optical system 30 is made up of a stop Sa, a single lens La, and a filter Fa. The second optical system 40 is made up of a stop Sb, a single lens Lb, and a filter Fb.

If light is incident on the lens La of the first optical system 30, the image forming positions of blue (B), green (G) and red (R) rays are formed in this order on the optical axis of the lens La so as to approach the image surface (i.e., go toward the first image capturing region Na from the lens La) due to a longitudinal chromatic aberration.

On the other hand, the lens Lb of the second optical system 40 has a different longitudinal chromatic aberration from the lens La of the first optical system 30. If light is incident on the lens Lb of the second optical system 40, the image forming positions of red, green and blue rays are formed in this order on the optical axis of the lens Lb so as to approach the image surface (i.e., go toward the second image capturing region Nb from the lens Lb). The second optical system 40 has the reverse longitudinal chromatic aberration because the longitudinal chromatic aberration is controlled by providing a diffraction grating for the imaging side lens surface of the single lens Lb.

The arithmetic processing section C processes the two images that have been obtained from the first and second image capturing regions Na and Nb, thereby generating a single image.

The following Tables 3 and 4 summarize design data for the first and second optical systems 30 and 40 of the image capture device A shown in FIG. 11. In Tables 3 and 4, ri denotes the paraxial radius of curvature (mm) of the surfaces, di denotes the interval (mm) between the respective centers of the surfaces, nd denotes the d-line refractive index of the lens or the filter, and vd denotes the Abbe number of the d line of the lens or the filter.

TABLE 3

Lens data: focal length = 5 mm, F value = 2.8, $\lambda$ = 550 nm, field of view $2\omega$ = 41.0 degrees, and effective image circle = $\phi 3.6$ mm

| Surface No. | ri | di | nd | vd |
|---|---|---|---|---|
| Object | ∞ | 600 | — | — |
| Stop | ∞ | 0.15 | — | — |
| R1 surface | −9.360618 | 2.05 | 1.5253 | 56.0 |
| R2 surface | −2.209847 | 0.2 | — | — |
| Filter 1 surface | ∞ | 0.4 | 1.5168 | 62.2 |
| Filter 2 surface | ∞ | 4.9 | — | — |
| Image surface | ∞ | — | — | — |

Aspheric coefficient

| | k | A4 | A6 | A8 | A10 | A12 |
|---|---|---|---|---|---|---|
| R1 surface | 0 | −0.036136 | 0.093437 | −0.253351 | 0.265391 | −0.101874 |
| R2 surface | −0.29183 | −0.000514 | −0.003577801 | 0.0013238 | −0.000377815 | 0.000005440 |

TABLE 4

Lens data: focal length = 5 mm, F value = 2.8, $\lambda$ = 550 nm, field of view $2\omega$ = 41.4 degrees, and effective image circle = $\phi 3.6$ mm

| Surface No. | ri | di | nd | vd |
|---|---|---|---|---|
| Object | ∞ | 600 | — | — |
| Stop | ∞ | 0.15 | — | — |
| R1 surface | −8.388239 | 2.05 | 1.5253 | 56.0 |
| R2 surface | −2.377743 | 0.2 | — | — |
| Filter 1 surface | ∞ | 0.4 | 1.5168 | 62.2 |
| Filter 2 surface | ∞ | 4.9 | — | — |
| Image surface | ∞ | — | — | — |

TABLE 4-continued

Lens data: focal length = 5 mm, F value = 2.8, λ = 550 nm, field of view 2ω = 41.4 degrees, and effective image circle = φ3.6 mm Aspheric coefficient

|  | k | A4 | A6 | A8 | A10 | A12 |
|---|---|---|---|---|---|---|
| R1 surface | 0 | −0.033063 | 0.090700 | −0.265445 | 0.290672 | −0.113899 |
| R2 surface | 0.502062 | 0.006111 | 0.000691403 | −0.0015210 | −0.000232742 | 0.000336119 |

Phase function coefficient (+first-order diffracted light)

|  | B2 | B4 | B6 | B8 | B10 |
|---|---|---|---|---|---|
| R2 surface | 127.95782 | 3.6697148 | 18.771722 | −27.375686 | 8.0272227 |

Supposing the distance as measured in the optical axis direction from a plane that contacts with the top of the plane is identified by x, the height as measured from the optical axis is identified by h, and r, k and Am (where m=4, 6, 8, 10 or 12) denote the paraxial radius of curvature, the conic constant and the $M^{th}$ aspheric coefficient, respectively, the aspheric shape of the lens is represented by the following Equation (1):

$$x = \frac{\frac{1}{r}h^2}{1 + \sqrt{1 - (1+k)\left(\frac{1}{r}\right)^2 h^2}} + A_4 h^4 + A_6 h^6 + A_8 h^8 + A_{10} h^{10} + A_{12} h^{12} \quad (1)$$

Also, in Table 4, if the height as measured from the optical axis is h and Bn (where n=2, 4, 6, 8 or 10) is the coefficient of an $n^{th}$ phase function, then the phase difference function φ(h) on the diffraction surface (i.e., R2 surface) is represented by the following Equation (2) (where the unit is radian):

$$\phi(h) = B_2 h^2 + B_4 h^4 + B_6 h^6 + B_8 h^8 + B_{10} h^{10} \quad (2)$$

Portions (1), (2) and (3) of FIG. 12(a) respectively show the spherical aberration, astigmatism and distortion of the first optical system 30. On the other hand, portions (1), (2) and (3) of FIG. 12(b) respectively show the spherical aberration, astigmatism and distortion of the second optical system 40.

FIGS. 13(a) and 13(b) show the longitudinal chromatic aberrations of the first and second optical systems 30 and 40, respectively. In FIGS. 13(a) and 13(b), the abscissa represents the wavelength of the light, while the ordinate represents the focus shift indicating how much the image forming positions has shifted with respect to the focal point of a green light ray with a wavelength of 0.55 μm. As can be seen from FIG. 13(a), in the first optical system 30, the shorter the wavelength of the light, the closer to the subject (i.e., the closer to the lens La) the light is focused. That is to say, in the first optical system 30, the image forming positions of blue, green and red rays are formed in this order on the optical axis so as to go toward the image surface (i.e., from the lens La to the first image capturing region Na). On the other hand, as can be seen from FIG. 13(b), in the second optical system 40, the shorter the wavelength of the light, the closer to the second image capturing region Nb the light is condensed on the optical axis. That is to say, in the second optical system 40, the image forming positions of red, green and blue rays are formed in this order on the optical axis so as to go toward the second image capturing region Nb from the lens Lb.

Unlike the first preferred embodiment described above, the first and second optical systems 30 and 40 are arranged according to this preferred embodiment so that their optical axes are parallel to each other. Also, according to this preferred embodiment, a parallax has been produced between the first and second color images that have been produced by the first and second optical systems 30 and 40. And the amount of parallax can be derived by pattern matching.

The arithmetic processing section C of this preferred embodiment includes not only the first and second sharpness detecting sections C1 and C2 and the image generating section C3 but also a parallax detecting section C4 for detecting the amount of parallax between the images provided by the first and second optical systems 30 and 40.

FIG. 14 illustrates how a rangefinder carries out triangulation. As shown in FIG. 14, a point P on the object O is supposed to be the measuring point. In that case, the object O is imaged on the first image capturing region Na by the lens La of the first optical system 30 and is also imaged on the second image capturing region Nb by the lens Lb of the second optical system 40.

If the point P is located on the optical axis Aa of the first optical system 30, the image of the point P will be produced at the intersection between the optical axis Aa of the first optical system 30 and the first image capturing region Na. The second optical system 40 is arranged so that the optical axes Aa and Ab of the first and second optical systems 30 and 40 are parallel to each other with a predetermined interval B left between them.

A line segment that connects together the intersection between the optical axis Ab of the second optical system 40 and the second image capturing region Nb and the intersection between the optical axis Aa of the first optical system and the first image capturing region Na is called a "base line", which is a line segment that never varies according to the position of the object and is used as a reference for triangulation. The length of that base line is equal to the interval B.

On the second image capturing region Nb, the image of the point P will be produced on the base line at a distance Δ from the optical axis Ab of the second optical system 40. This distance is called a "parallax" and its magnitude is called the "magnitude Δ of parallax".

Supposing the focal length of the image capturing lenses La and Lb of the first and second optical systems 30 and 40 is identified by f, the following approximation equation is satisfied:

$$\Delta \approx B \cdot \frac{f}{Z} \quad (3)$$

By making pattern matching between the first and second color images produced on the first and second image capturing regions Na and Nb, the amount of parallax Δ can be obtained. The amount of parallax Δ is usually calculated on a pixel basis but may also be calculated on a 0.1 pixel (subpixel) basis by performing interpolation processing.

The parallax detecting section C4 of the arithmetic processing section C detects the amount of parallax Δ with respect to each very small area of the images that have been produced in the first and second image capturing regions Na and Nb and aligns the two images with each other based on the amount of parallax Δ detected. The arithmetic processing section C can generate an image by using one of the two image components that has the higher degree of sharpness on a color-by-color basis by the same method as what has already been described for the first preferred embodiment.

Nevertheless, the first and second optical systems 30 and 40 have mutually different longitudinal chromatic aberrations. That is why if the pattern matching is carried out on the color images as they are, the parallax cannot be detected accurately. Comparing the spherical aberrations shown in FIGS. 12(a) and 12(b) to each other, it can be seen that the green components (with a wavelength of 550 nm) have similar properties. For that reason, if the pattern matching is carried out using only the green component, the amount of parallax Δ can be detected accurately.

By performing the calculation represented by Equation (3) with respect to Z and by substituting the amount of parallax Δ, the base line length B and the focal length f into Equation (3), the distance Z can be obtained based on the principle of triangulation.

The first preferred embodiment is designed so that PBa and PRb have substantially the same focus shift and PRa and PBb also have substantially the same focus shift in FIG. 4. If each of the optical systems 10 and 20 has two lenses as in the first preferred embodiment described above, it is difficult, considering the wavelength dispersion property of the lens material, to design those optical systems so that the green components will cause the same magnitude of focus shift and that the red and blue components will cause exactly inverse magnitudes of focus shift. For that reason, according to the first preferred embodiment, there is some error between PGa and PGb.

On the other hand, according to this preferred embodiment, a diffraction grating is provided for the subject side lens surface of the second optical system 40. Thus, even if the green components causes the same magnitude of focus shift between the first and second optical systems 30 and 40, the longitudinal chromatic aberrations can be set so that the red and blue components will cause exactly inverse magnitudes of focus shift. As a result, an image can be generated so as to have an even higher degree of sharpness.

In general, a diffraction grating is provided to correct the longitudinal chromatic aberration of an optical system. According to this preferred embodiment, however, settings are determined so that the diffraction grating corrects the longitudinal chromatic aberration of the second optical system 40 excessively and that the longitudinal chromatic aberration becomes the reverse of that of the first optical system 30.

FIG. 15 shows graphs representing the through focus MTF properties of the first and second optical systems 30 and 40.

In FIG. 15, the upper and lower graphs represent the through focus MTF properties of the first and second optical systems 30 and 40, respectively. Also, in FIG. 15, the abscissa represents the focus shift and the ordinate represents the MTF at a spatial frequency of 30 Lp/mm. In the graph representing the property of the first optical system 30, MBa, MGa, and MRa represent the through focus MTF properties of blue, green and red components, respectively, and PBa, PGa and PRa represent their peaks. Likewise, in the graph representing the property of the second optical system 40, MRb, MGb, and MBb represent the through focus MTF properties of red, green and blue components, respectively, and PRb, PGb and PBb represent their peaks. According to this preferred embodiment, the optical systems are designed so that when the magnitudes of focus shift of PGa and PGb are equalized with each other, the magnitudes of focus shift of PBa and PRb are substantially equal to each other and that the magnitudes of focus shift of PRa and PBb are substantially equal to each other.

According to this preferred embodiment, the first and second sharpness detecting sections C1 and C2 in the arithmetic processing section C may actually calculate the respective degrees of sharpness (i.e., the absolute values of differences between their luminance values) of the first and second optical systems 30 and 40 and then choose one of the two components that has the higher degree of sharpness (i.e., the greater absolute value of difference between the luminance values) on a color-by-color basis. Alternatively, the distances to the subject may also be used and one of the two color components that has the higher MTF property at that distance may also be chosen. In that case, stored in the arithmetic processing section C are correlations between the subject distance and the MTF property in the first and second optical systems 30 and 40. And after the distance to the subject has been measured, one of the two color components that has the higher MTF property is chosen.

According to this preferred embodiment, not just the effects of the first preferred embodiment are all achieved but also the device of this preferred embodiment can function as a rangefinder as well.

In addition, by providing a diffraction grating for the lens surface of the single lens Lb, the longitudinal chromatic aberration can be controlled, and therefore, the three colors can have substantially the same magnitude of focus shift. As a result, an output image with an even higher degree of sharpness can be generated, and the amount of parallax can be calculated highly accurately. Furthermore, according to this preferred embodiment, the optical path is not slit unlike the first preferred embodiment, and therefore, an even brighter image can be obtained than in the first preferred embodiment.

In this preferred embodiment, each of the optical systems 30 and 40 has only one lens. However, each of those optical systems 30 and 40 may have multiple lenses as well.

Optionally, with the optical systems of this preferred embodiment used, the optical path may be split by a half mirror as in the first preferred embodiment described above. In that case, it is not always necessary to equalize the magnitudes of focus shift of the green components with each other between the first and second optical systems 30 and 40.

Although the image capture device of the preferred embodiment described above includes the two optical systems 30 and 40, the device may also include three or more optical systems with mutually different longitudinal chromatic aberration properties. FIG. 16 is a graph showing the longitudinal chromatic aberrations of three or more optical systems that are included in the same image capture device. In FIG. 16, the abscissa represents the wavelength of light, while the ordinate represents the focus shift indicating how much the image forming position has shifted with respect to the focal point of a green ray with a wavelength of 0.55 μm (i.e., the focal point of a green ray is supposed to be the reference (0.00)). As shown in FIG. 16, in the first optical system, the shorter the wavelength of a light ray, the closer to the subject (i.e., the closer to the lens) the light ray is focused. In the second optical system, on the other hand, the shorter the wavelength of a light ray, the closer to the image capturing region that light ray is focused. And in the third optical system, light rays with wavelengths of 0.45 μm and 0.65 μm cause a focus shift of zero and the focal point shifts gently toward the subject in the wavelength range of 0.45 μm through 0.65 μm (and is closest to the subject at a wavelength of 0.55 μm). By using these three optical systems, the degree of sharpness can be increased at a middle distance compared to a situation where two optical systems are used.

INDUSTRIAL APPLICABILITY

The image capture device of the present invention can be used effectively as a digital still camera or a digital camcorder, for example, and can also be used as a rangefinder.

REFERENCE SIGNS LIST

| | |
|---|---|
| A | image capture device |
| Sa | stop of first optical system |
| Sb | stop of second optical system |
| L1a, L2a, La | lens(es) that form(s) first optical system |
| L2b, L2b, Lb | lens(es) that form(s) second optical system |
| Na | first image capturing region |
| Nb | second image capturing region |
| 10, 10a, 10b | first optical system |
| 20, 20a, 20b | second optical system |
| 30 | first optical system |
| 40 | second optical system |

The invention claimed is:

1. An image capture device comprising:
a first optical system that has a longitudinal chromatic aberration to cause first, second and third colors to form images at mutually different positions on an optical axis;
a first image capturing region for generating an image that has a component in at least one of the first, second and third colors by using light that has been transmitted through the first optical system;
a second optical system that has a different longitudinal chromatic aberration from that of the first optical system;
a second image capturing region for generating an image that has a component in the same color as the at least one color by using light that has been transmitted through the second optical system; and
an arithmetic processing section for generating an output image by using one of the two images that has been generated in the first or second image capturing region so as to have the component in the at least one color apiece and that has the component with the higher degree of sharpness.

2. The image capture device of claim 1, wherein each of the first and second image capturing regions generates an image that has components in two or more of the first, second and third colors, and
wherein the arithmetic processing section generates the output image by using one of the two images that has the component with the higher degree of sharpness with respect to each of the two or more colors.

3. The image capture device of claim 1, wherein in the first optical system, the image forming positions of light rays in the first, second and third colors are located in this order on the optical axis toward an image surface, and
wherein if each of the two images that have been supplied from the first and second image capturing regions has components in the first, second and third colors, then the arithmetic processing section generates the output image that includes components in the first, second and third colors by using one of the two components that has the higher degree of sharpness with respect to each of the first, second and third colors.

4. The image capture device of claim 3, wherein the first and second optical systems have a through focus MTF property with first, second and third ranges on the optical axis, and
wherein in the first range, an MTF value at a particular spatial frequency is equal to or greater than a predetermined value in the first optical system with respect to the first and second colors but is less than the predetermined value in the first optical system and is equal to or greater than the predetermined value in the second optical system with respect to the third color, and
wherein in the second range, the MTF value at the particular spatial frequency becomes equal to or greater than the predetermined value in at least one of the first and second optical systems with respect to each of the first, second and third colors, and
wherein in the third range, the MTF value at the particular spatial frequency becomes equal to or greater than the predetermined value in the first optical system with respect to the second and third colors, but is less than the predetermined value in the first optical system and equal to or greater than the predetermined value in the second optical system with respect to the first color.

5. The image capture device of claim 3, wherein the second range is defined on the optical axis so as to include the first and second image capturing regions if the second range has a longer subject distance than the first range, and
wherein the third range is defined on the optical axis so as to include the first and second image capturing regions if the third range has a longer subject distance than the first and second ranges.

6. The image capture device of claim 1, further comprising a light splitting member for splitting the respective optical paths of the first and second optical systems.

7. The image capture device of claim 1, wherein the respective optical axes of the first and second optical systems are parallel to each other, and
wherein the first and second image capturing regions are defined on the same plane.

8. The image capture device of claim 1, wherein the first, second and third colors are the colors blue, green and red, respectively, and
wherein in the first optical system, the image forming positions of blue, green and red light rays are located in this order on the optical axis toward the image surface, and
wherein in the second optical system, the image forming positions of red, green and blue light rays are located in this order on the optical axis toward the image surface.

9. The image capture device of claim 1, wherein the arithmetic processing section includes:
a first sharpness detecting section for detecting, on a predetermined area basis, the color-by-color degree of sharpness of the image that has been provided by the first optical system;
a second sharpness detecting section for detecting, on a predetermined area basis, the color-by-color degree of sharpness of the image that has been provided by the second optical system; and an image generating section for generating the output image on a predetermined area basis based on the color-by-color degrees of sharpness that have been detected on a predetermined area basis from the images that have been provided by the first and second optical systems.

10. The image capture device of claim 9, wherein the arithmetic processing section further includes an amount of parallax detecting section for detecting the amount of parallax between the respective green components of the first and second optical systems, and wherein the image generating section generates the output image based on the amount of parallax.

11. The image capture device of claim 10, wherein a distance to the subject is measured based on the amount of parallax.

12. The image capture device of claim 1, wherein the arithmetic processing section chooses one of the two components that has the higher degree of sharpness from the two images that have been supplied from the first and second image capturing regions with respect to each of the first, second and third colors and uses the three components thus chosen as the first, second and third color components of the output image.

13. The image capture device of claim 1, wherein the arithmetic processing section generates the output image by adding together, on a color-by-color basis, the respective first, second and third color components of the images that have been supplied from the first and second image capturing regions.

14. The image capture device of claim 1, wherein the arithmetic processing section determines which of the first, second and third color components has the highest degree of sharpness and increases the sharpness of the other color components based on the component with the highest degree of sharpness.

15. The image capture device of claim 1, wherein in at least one of the first and second optical systems, at least one lens surface has a diffraction lens shape.

16. An image capture device comprising:
a first optical system that has a longitudinal chromatic aberration to cause first, second and third colors to form images at mutually different positions on an optical axis;
a first image capturing region for generating an image that has a component in at least one of the first, second and third colors by using light that has been transmitted through the first optical system;
a second optical system that has a different longitudinal chromatic aberration from that of the first optical system;
a second image capturing region for generating an image that has a component in the same color as the at least one color by using light that has been transmitted through the second optical system; and
an arithmetic processing section for generating an output image by using one of the two images that has been generated in the first or second image capturing region so as to have the component in the at least one color apiece and that has the component with the higher contrast.

17. The image capture device of claim 16, wherein each of the first and second image capturing regions generates an image that has components in two or more of the first, second and third colors, and wherein the arithmetic processing section generates the output image by using one of the two images that has the component with the higher contrast with respect to each of the two or more colors.

18. The image capture device of claim 16, wherein the arithmetic processing section includes:
a first contrast detecting section for detecting, on a predetermined area basis, the color-by-color contrast of the image that has been provided by the first optical system;
a second contrast detecting section for detecting, on a predetermined area basis, the color-by-color contrast of the image that has been provided by the second optical system; and
an image generating section for generating the output image on a predetermined area basis based on the color-by-color contrast that has been detected on a predetermined area basis from the images that have been provided by the first and second optical systems.

* * * * *